United States Patent
Wu et al.

(10) Patent No.: US 10,439,883 B2
(45) Date of Patent: Oct. 8, 2019

(54) DATA TRANSFER SYSTEM, AND TOPOLOGY ARCHITECTURE BUILDING METHOD AND TOPOLOGY ARCHITECTURE REPAIRING METHOD THEREOF

(71) Applicant: Industrial Technology Research Institute, Hsinchu (TW)

(72) Inventors: Chien-Yu Wu, Yunlin County (TW); Sue-Chen Liao, Taichung (TW); Tsai-Kan Chien, Yunlin County (TW)

(73) Assignee: Industrial Technology Research Institute, Hsinchu (TW)

( * ) Notice: Subject to any disclaimer, the term of this patent is extended or adjusted under 35 U.S.C. 154(b) by 408 days.

(21) Appl. No.: 15/391,844

(22) Filed: Dec. 28, 2016

(65) Prior Publication Data

US 2018/0146044 A1    May 24, 2018

(30) Foreign Application Priority Data

Nov. 23, 2016 (TW) .............................. 105138513 A

(51) Int. Cl.
*H04L 12/24* (2006.01)
*H04L 29/08* (2006.01)

(52) U.S. Cl.
CPC .............. *H04L 41/12* (2013.01); *H04L 67/06* (2013.01); *H04L 41/0672* (2013.01)

(58) Field of Classification Search
CPC ...... H04L 41/0672; H04L 41/12; H04L 67/06
(Continued)

(56) References Cited

U.S. PATENT DOCUMENTS 6,091,733 A   7/2000  Takagi et al.
7,983,196 B2  7/2011  Yanagihara
(Continued)

FOREIGN PATENT DOCUMENTS

CN   101292467   10/2008
CN   105103504   11/2015
(Continued)

OTHER PUBLICATIONS

"Office Action of Taiwan Counterpart Application," dated May 22, 2017, p. 1-p. 3.
(Continued)

*Primary Examiner* — James E Springer
(74) *Attorney, Agent, or Firm* — JCIPRNET

(57) ABSTRACT

A data transfer system is provided. The system includes a plurality of electronic devices and a data transfer management device. The data transfer management device identifies a master device among the electronic devices, and the data transfer device make the master device as a root node of a topology architecture, wherein the master device is configured to provide data. The data transfer device calculates a maximum connection amount according to a first transfer time, wherein the data transfer device selects a plurality of slave devices among the electronic devices according to the maximum connection amount. The data transfer device divides the master device into a transmitting node queue, and arranges the slave devices into a receiving node queue in sequence. And, the data transfer device builds a plurality of layers of the topology architecture and sets a plurality of layer transfers corresponding to the layers.

10 Claims, 18 Drawing Sheets

(58) Field of Classification Search
USPC .......................................................... 709/208
See application file for complete search history.

(56) References Cited

U.S. PATENT DOCUMENTS

| | | | |
|---|---|---|---|
| 8,005,225 | B2 | 8/2011 | Kim et al. |
| 8,238,269 | B2 | 8/2012 | Rousseau et al. |
| 8,543,681 | B2 | 9/2013 | Bearden et al. |
| 2005/0047390 | A1 | 3/2005 | Park et al. |
| 2006/0013172 | A1* | 1/2006 | Ruuska ................ H04B 1/7143 370/338 |
| 2013/0137441 | A1 | 5/2013 | Kruglick |
| 2013/0170336 | A1* | 7/2013 | Chen ........................ H04L 12/44 370/221 |
| 2014/0160982 | A1* | 6/2014 | Imai ...................... H04L 41/145 370/254 |
| 2017/0310552 | A1* | 10/2017 | Wallerstein ............. H04L 41/22 |
| 2018/0309636 | A1* | 10/2018 | Strom ..................... H04L 41/12 |

FOREIGN PATENT DOCUMENTS

| | | |
|---|---|---|
| TW | 200635293 | 10/2006 |
| TW | 201138506 | 11/2011 |

OTHER PUBLICATIONS

"Notice of Allowance of Taiwan Counterpart Application," dated Aug. 9, 2017, p. 1-p. 4.

Yu Zheng et al., "Master-Slave Switching Nodes for Power Grid Communications in Substation Based on Software Defined Network".

Sanjay K. Dhurandher et al., "Time Stamp-based Algorithm for Task Scheduling in a Distributed Computing System with Multiple Master Multiple Slave Architecture", IEEE International Conferences on Internet of Things, and Cyber, Physical and Social Computing, 2011.

Wen-Kang Jia et al., "A Tele traffic Perspective on Relay-Node Selection Strategy in VoP2P ", IEEE International Conference on Networking, Architecture, and Storage, 2009.

Zhenliang Zhang et al., "Detection Performance in Balanced Binary Relay Trees With Node and Link Failures", IEEE Transactions on Signal Processing, vol. 61, No. 9, May 1, 2013.

Congchun He et al., "TCP performance for request/reply traffic over a low-bandwidth link".

* cited by examiner

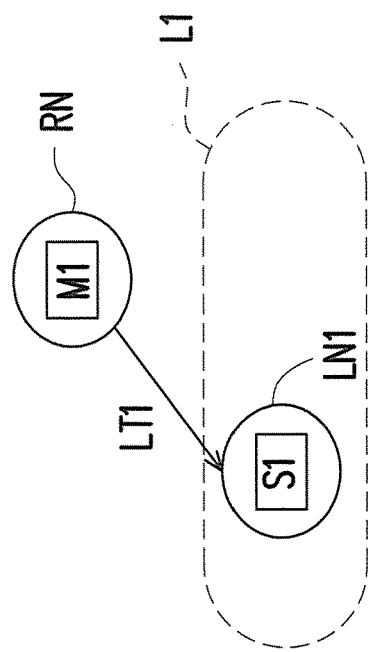
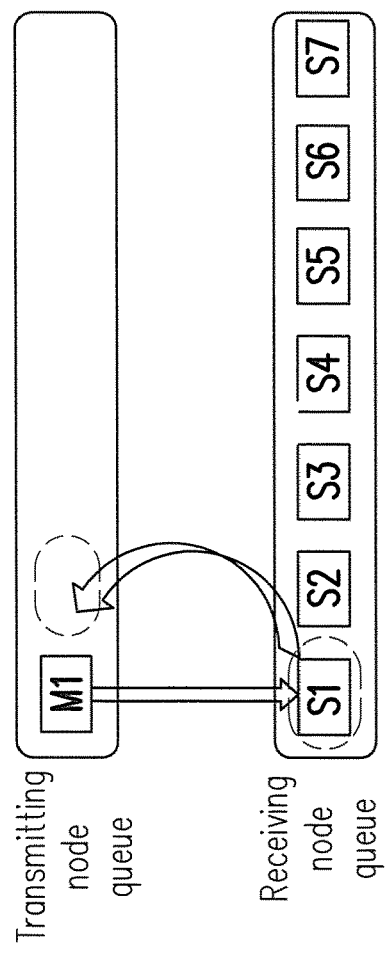
FIG. 3B
FIG. 3A

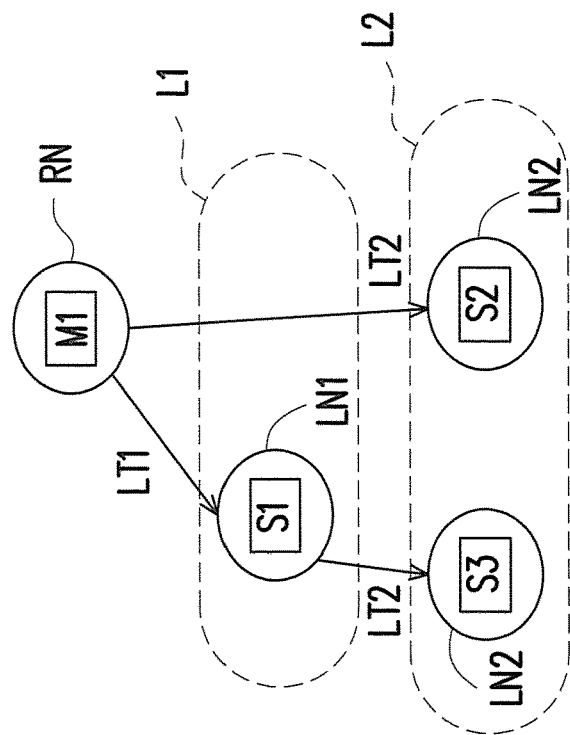
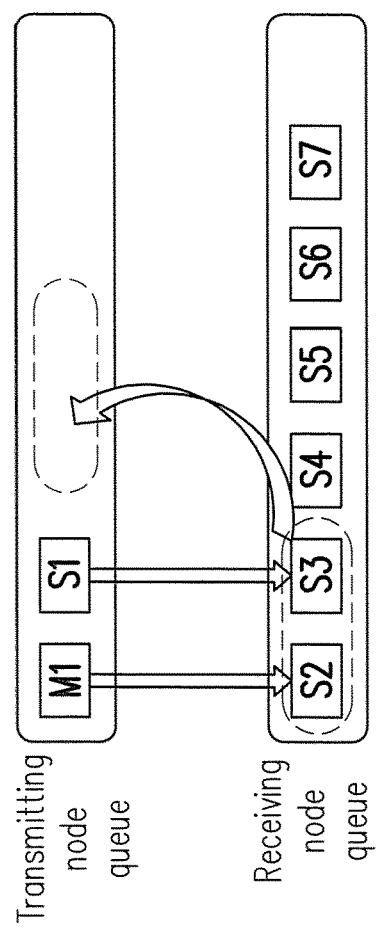
FIG. 4B
FIG. 4A

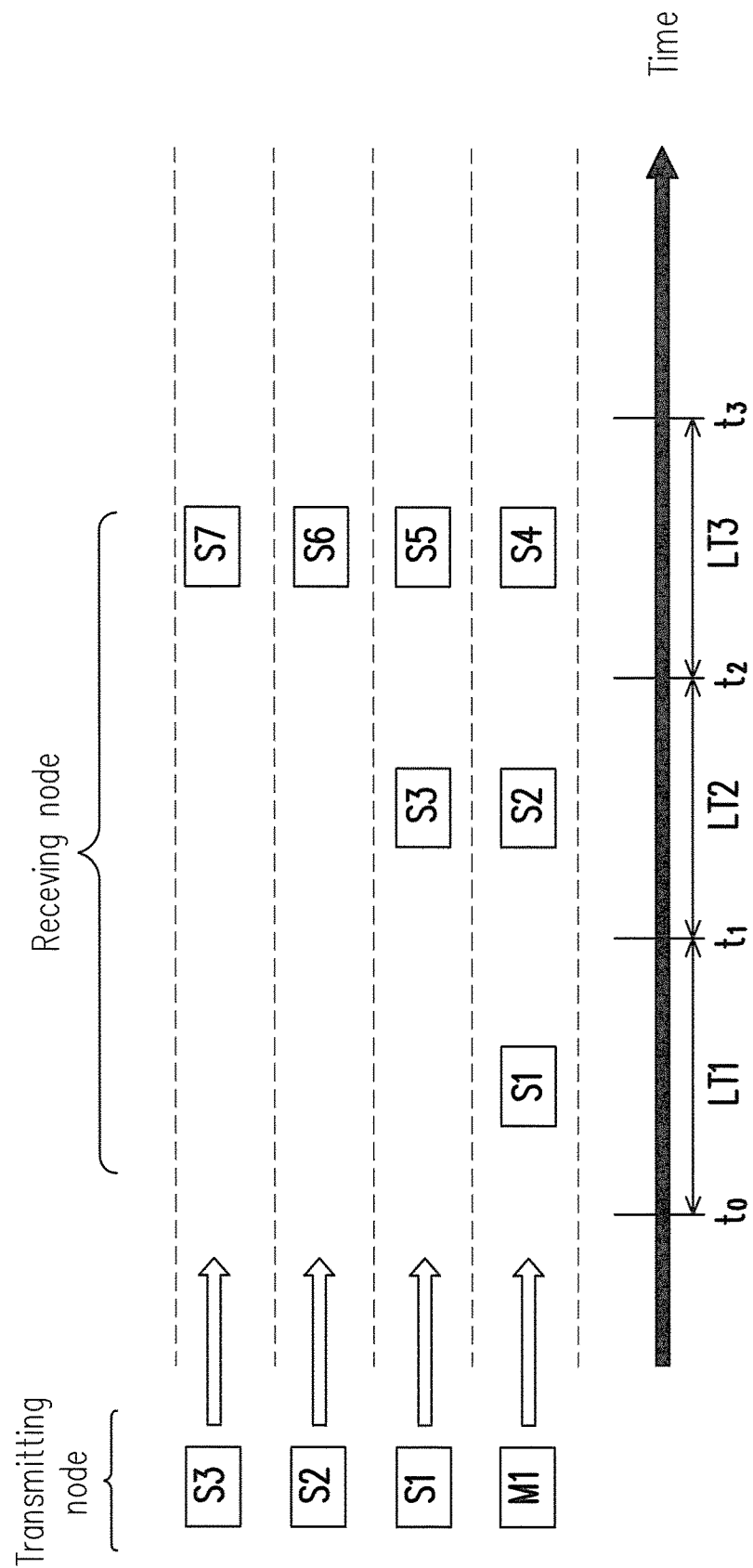

US 10,439,883 B2

DATA TRANSFER SYSTEM, AND TOPOLOGY ARCHITECTURE BUILDING METHOD AND TOPOLOGY ARCHITECTURE REPAIRING METHOD THEREOF

CROSS-REFERENCE TO RELATED APPLICATION

This application claims the priority benefit of Taiwan application serial no. 105138513, filed on Nov. 23, 2016. The entirety of the above-mentioned patent application is hereby incorporated by reference herein and made a pail of this specification.

BACKGROUND

Technical Field

The invention relates to a data transfer system, and more particularly, to a data transfer system, and a topology architecture building method and a topology architecture repairing method thereof.

Description of Related Art

With the progress of the times, in today's living applications, in the home, classroom, office, conference room, tour guide and other environments, can use desktop, laptop, tablet, mobile phone and other platform device to share video, audio or other files/data to other devices.

In general, the current data synchronous transfer scheme utilizes a topology architecture corresponding to a plurality of devices (slave devices) to perform data transfer. For example, assuming a device (master device) performs synchronous sharing to N devices, although the transfer mechanism of the TCP/IP packet acknowledgment can be used if the transfer is performed in the manner of unicast, for a data amount of 1 time frame, it would spend total N time frames of time for performing the synchronous sharing to all N devices with the one time frame data amount. The reason is that the unicast re-perform a data transfer to another slave device after a master device transferred a data of 1 time frame to a slave device and so on to transfer sequentially the data to the last slave device. When the data transfers for all slave devices are completed, it is considered as the completion of the synchronous data transfer of the 1 time frame data for N slave devices. Therefore, although the data transfer performed by the manner of unicast would be more accurate, the time spent for synchronizing the data transfer performed by the manner of unicast would be more, too. Accordingly, finding a way to maximize the amount of connectible slave devices and reduce the time-consuming for synchronous data transfer to increase the speed of the synchronous data transfer has become one of research topics for persons skilled in the art.

SUMMARY

The invention is directed to a data transfer system, and a topology architecture building method and a topology architecture repairing method thereof, which are capable of maximizing the amount of connectible slave devices and reducing the time-consuming for synchronous data transfer. Furthermore, the provided topology architecture repairing method is capable of performing a repairing operation to the topology architecture when some node of the topology architecture is disconnected, so as to maintain the function of the topology architecture.

An embodiment of the invention provides a data transfer system for transferring a data, and the system comprises a plurality of electronic devices and a data transfer management device. The data transfer management device is coupled to the electronic devices and configured to build a topology architecture, wherein the topology architecture is configured to indicate a connection relationship and a transfer order between the electronic devices. The operation of building the topology architecture comprises: the data transfer management device identifies a master device among the electronic devices, and the data transfer management device makes the master device as a root node of the topology architecture, wherein the master device is configured to provide the data; the data transfer management device calculates a maximum connection amount according to a first transfer time, wherein the first transfer time indicates an average time for transferring the data between two electronic devices; the data transfer management device selects a plurality of slave devices other than the master device among the electronic devices according to the maximum connection amount, wherein an amount of the slave devices is equal to the maximum connection amount; the data transfer management device divides the master device into a transmitting node queue, and arranges the slave devices into a receiving node queue in sequence; and the data transfer management device builds a plurality of layers of the topology architecture and sets a plurality of layer transfers corresponding to the layers according to the transmitting node queue and the receiving node queue, wherein the data transfer management device indicates the master device and the slave devices to perform a transfer operation corresponding to the data according to the built topology architecture after the operation of building the topology architecture is completed.

An embodiment of the invention provides a topology architecture building method for a plurality of electronic devices. The method comprises: identifying a master device among the electronic devices, and making the master device as a root node of a topology architecture, wherein the master device is configured to provide a data; calculating a maximum connection amount according to a first transfer time, wherein the first transfer time indicates an average time for transferring the data between two electronic devices; selecting a plurality of slave devices other than the master device among the electronic devices according to the maximum connection amount, wherein an amount of the slave devices is equal to the maximum connection amount; dividing the master device into a transmitting node queue, and arranges the slave devices into a receiving node queue in sequence; and building a plurality of layers of the topology architecture and setting a plurality of layer transfers corresponding to the layers according to the transmitting node queue and the receiving node queue.

An embodiment of the invention provides a topology architecture repairing method for a topology architecture, wherein the topology architecture is configured to indicate a connection relationship and a transfer order between a master device and a plurality of slave devices. The method comprises: repairing the topology architecture according to a first specific event and the topology architecture if the first specific event occurred, wherein the first specific event comprises one of the plurality of slave devices is removed from the topology architecture, wherein the one slave device removed from the topology architecture is a removed slave device; and indicating the master device and the plurality of slave devices to perform a transfer operation corresponding to a data according to the repaired topology architecture after repairing of the topology architecture is completed.

Based on the above, the data transfer system, and the topology architecture building method and the topology architecture repairing method thereof provided in the embodiments of the invention can distribute the transmission of the data by the manner of unicast and the using of the relay nodes, so as to ensure the correctness of the data, and reduce the time spent for overall synchronization of data transfer, such that the efficiency of data transfer would be increased. In another aspect, when some node of the built topology architecture is disconnected, the system and the methods can select proper other nodes to repair or rebuild the topology architecture, so as to maintain the stability of the overall topology architecture to ensure the data to keep being performed the synchronous transfer.

To make the above features and advantages of the invention more comprehensible, several embodiments accompanied with drawings are described in detail as follows.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 3A is a schematic diagram for setting a first layer transfer according to an embodiment of the invention.

FIG. 3B is a schematic diagram illustrating a built topology architecture corresponding to the first layer data transfer according to an embodiment of the invention.

FIG. 4A is a schematic diagram for setting a second layer transfer according to an embodiment of the invention.

FIG. 4B is a schematic diagram illustrating a built topology architecture corresponding to the second layer data transfer according to an embodiment of the invention.

FIG. 6 is a schematic diagram illustrating a data transfer operation according to an embodiment of the invention.

DESCRIPTION OF THE EMBODIMENTS

Figure 1:
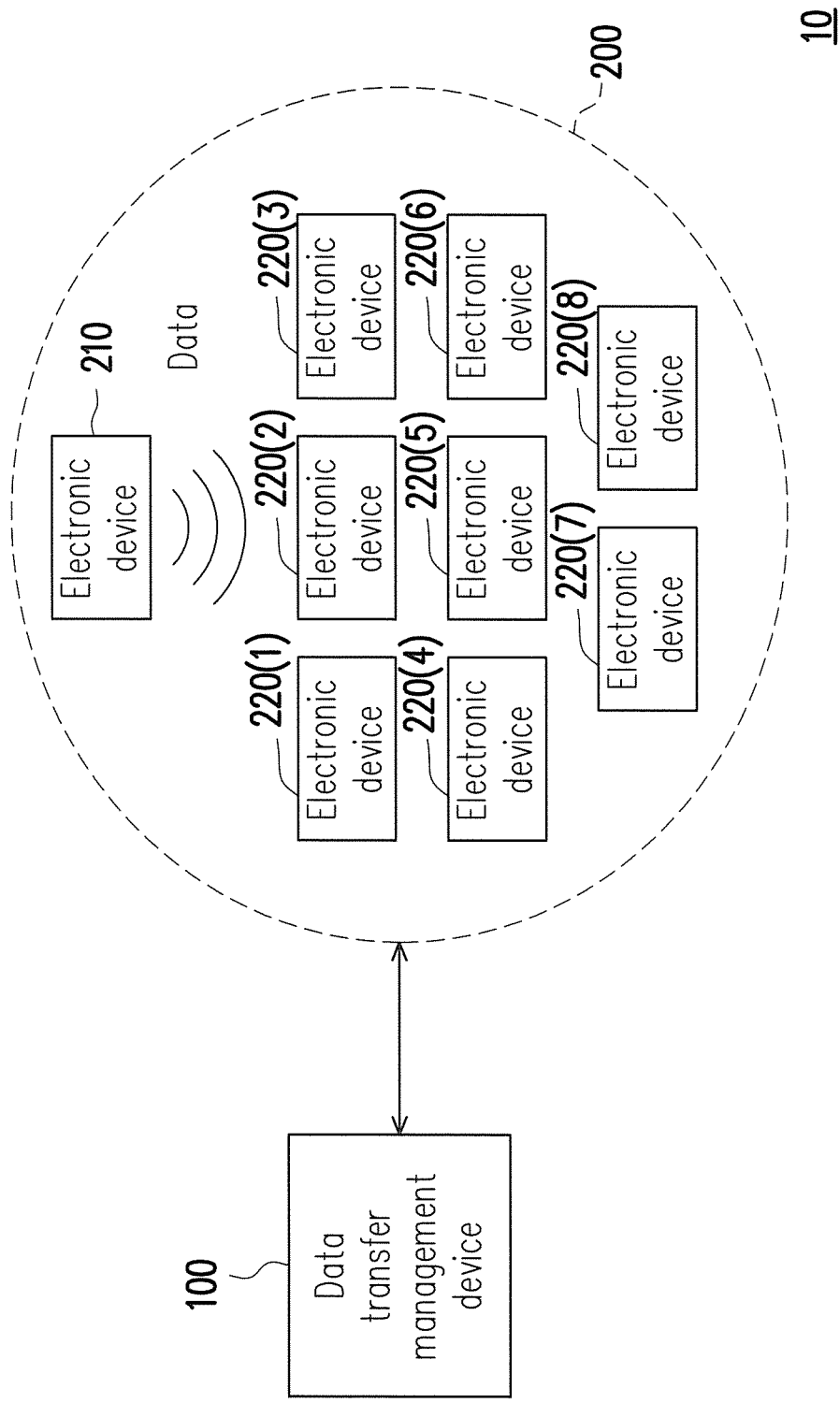
FIG. 1 is a schematic diagram illustrating a data transfer system according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

FIG. 1 is a schematic diagram illustrating a data transfer system according to an embodiment of the invention. Referring to FIG. 1, in the present embodiment, the data transfer system 10 includes a data transfer management device 100, a plurality of electronic devices 200. For example, as illustrated in FIG. 1, assuming the electronic devices 200 include an electronic device (e.g., electronic device 210) configured to provide data to other electronic devices and the other electronic devices (e.g., electronic devices 220(1)-220(8)) for receiving the data. The electronic device 210 is also referred to as a master device which is configured to provide a data to be shared. The electronic device 210 is the original data provider of the data (i.e., the original data source of the data). The electronic devices 220(1)-220(8) are also referred to as slave devices 220(1)-220(8) which are configured to receive the data from the master device 210. The data may be a data such as a video stream, an audio stream or the like.

In the present embodiment, the data transfer management device 100 and electronic devices 210, 220(1)-220(8) are connected in a wireless or wired manner, and the data transfer management device 100 is configured to build the topology architecture. Furthermore, the data transfer management device 100 indicates a connection relationship and a transfer order between the electronic devices 210, 220(1)-220(8) through the topology architecture, such that the data would be performed a synchronous transfer by the topology architecture. In the present embodiment, the data transfer management device 100, for example, is a server, router or a circuit (e.g., data transfer management circuit), wherein the data transfer management device 100 stores software/firmware (e.g., data transfer management application) for managing data transfer or has the data transfer management circuit, so as to implement the data transfer system, and the topology architecture building method and the topology architecture repairing method. For example, in another embodiment the master device (e.g., electronic device 210) about to share the data synchronously stores software/firmware (e.g., data transfer management application) for managing data transfer, and the master device may execute the data transfer management application to build the topology architecture according to the other devices among the electronic devices 200 and to perform a synchronous data transfer with electronic devices 220(1)-220(8) by the built topology architecture. It should be noted, if the data transfer management device 100 is implemented in a way of data transfer management circuit, the data transfer management circuit may be disposed in the server/router for managing electronic devices 210, 220(1)-220(8), or disposed in the electronic device (e.g., electronic device 210) for providing data to other electronic devices.

The main idea of the topology architecture provided by the present invention is that the electronic device (slave device) using unicast and receiving the data can also be the provider of the data so that all the slave devices receiving the data can provide the data together with the master device to other electronic devices have not yet received the data, and then complete the synchronous data transfer. The synchronous transfer of the data indicates that the time spent for transfer the same time frame of data from a master device to a plurality of slave devices may be less than a tolerance time. In other words, the synchronous data transfer provided by the invention can let all slave device to obtain the same time frame of data within the tolerance time. The data transfer operation and the topology architecture building method provided by the present invention will be described below in conjunction with a plurality of figures and embodiments.

Figure 2:
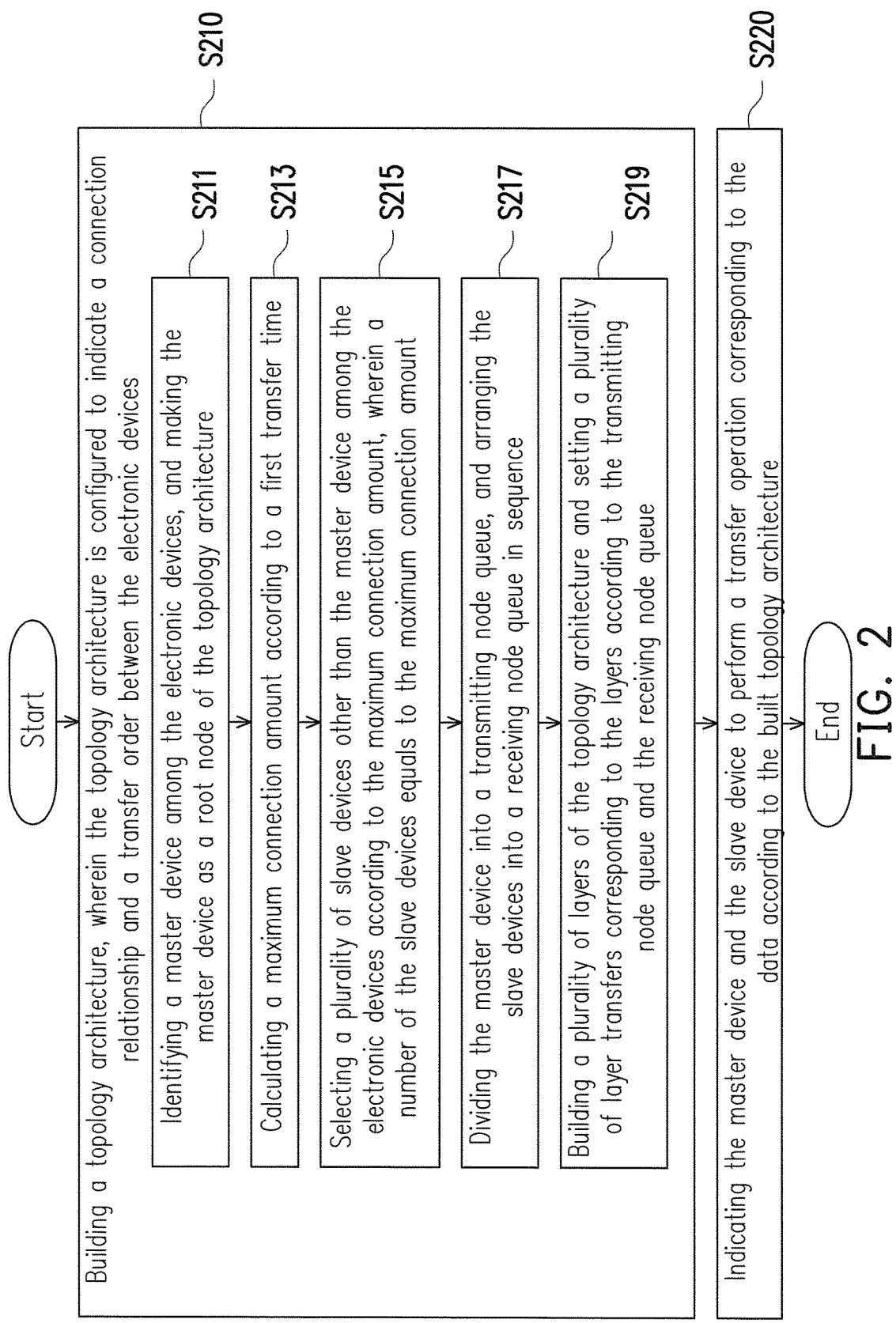
FIG. 2 is a flowchart illustrating a data transfer operation according to an embodiment of the invention.

FIG. 2 is a flowchart illustrating a data transfer operation according to an embodiment of the invention. Referring FIG. 1 and FIG. 2, in step S210, the data transfer management device 100 builds the topology architecture, wherein the topology architecture is configured to indicate a connection relationship and a transfer order between the electronic devices 200.

In the present embodiment, step S210 further includes the following steps: step S211, step S213, step S215, step S217 and step S219. In step S211, the data transfer management device 100 identifies a master device among the electronic devices 200, and making the master device as a root node of the topology architecture. For example, as described above, in the example of FIG. 1, the data transfer management device 100 actively identifies the electronic device 210 as a master device for providing data. As another example, the electronic device 210 about to be share data synchronously may send a request to the data transfer management device 100 to make the data transfer management device 100 recognize that the electronic device 210 is the master device for providing data. The root node of the topological architecture is used to indicate that the original version of all the data transferred in the topology architecture is from the electronic device being (in) the root node. In other words, the data begins to propagate from the root node of the topology architecture to the other nodes of the topology architecture. The data transfer management device 100 selects a plurality of slave devices for receiving the data provided by the master device from the electronic devices 220(1)-220(8), and the selected slave devices are the other nodes of the topology architecture.

In the present embodiment, in addition to the root node, the topology architecture has relay node(s) and leaf node(s). Specifically, suppose that a topology architecture from the root node extends many nodes from top to bottom (assuming the root node is on the top of the topology architecture). All nodes of the topology architecture will have a parent node or a child node. A parent node of one node is used to indicate the parent node is for providing data to the one node, and the parent node of the one node is located at a layer above a layer to which the one node belongs. In contrast, a child node of one node is used to indicate that the child node is for receiving data from the one node, and the child node of the one node is located at a layer below a layer to which the one node belongs. The relay node is a node that has a child node. The leaf node is a node having no child node. In other words, the leaf node will be at the end(s) of the topological architecture. In the present embodiment, if a node has a parent node, the node has only one parent node. In addition, if a node has a child node, the node may have multiple child nodes.

In step S213, the data transfer management device 100 calculates a maximum amount of connections according to a first transfer time. In particular, the first transfer time is used to indicate the time required to transfer a data between two electronic devices. For example, it is assumed that the electronic device 210 is connected to the electronic device 220(0) and the data size to be transferred is X bytes, where X is an integer. In addition, the average connection speed between the electronic device 210 and the electronic device 220(0) is Y bytes per second (i.e., Y bytes/sec). The first transfer time is the quotient value of the size (X bytes) of the data divided by the average connection speed (Y bytes/sec), where the unit of the first transfer time is second (i.e., the first transfer time would be Y/X seconds). The average connection speed can also be averaged based on the connection speed between all the devices. The present invention is not limited to the manner in which the average connection speed is obtained.

As described above, the synchronous transfer of the data is that the transfers of the data can be regarded as a synchronous transfer if the time spent for transferring the same data from one master device to the plurality of slave devices is less than the tolerance time. Based on this, the data transfer management device 100 divides the tolerance time by the above-described first transfer time to obtain another quotient value. Next, the data transfer management device 100 unconditionally rounds out the other quotient value to an integer to obtain a value (e.g., K) as the maximum layer transfer amount. Finally, the data transfer management device 100 calculates the maximum connection amount by using the maximum layer transfer amount. In detail, the data transfer management device 100 performs a Kth power operation of 2 and obtains the result of this operation (i.e., the result of $2^K$ is calculated), where K is the maximum layer transfer amount. Next, the data transfer management device 100 takes the value obtained by subtracting 1 from $2^K$ as the maximum connection amount. It should be noted that in the present embodiment, the upper limit of the total amount of layers of the topology architecture that can be established is the maximum layer transfer amount, and the maximum connection amount is the upper limit of the total amount of connecting slave devices in the topology architecture. In other words, the total amount of layers of the built topology architecture may be less than or equal to the maximum layer transfer amount and the total amount of all connecting slave devices of the topology architecture may be less than or equal to the maximum connection amount.

For purposes of illustration, in the present embodiment, the total amount of layers of the topology architecture is equal to the maximum layer transfer amount, and the total amount of all the connecting slave devices of the topology architecture is equal to the maximum connection amount. For example, if the tolerance time is 1 second, an average connection speed of 1 million bytes/sec (e.g., 1 MB/sec.) and the size of data is 330000 bytes. The calculated first transfer time is 0.33 seconds. Also, the maximum layer transfer amount (i.e., K) will be 3 (e.g., 1/0.33= 3.0303 . . . , which is unconditionally rounded out to an integer 3). Finally, the maximum connection amount is 7 (e.g., $2^K-1=2^3-1=7$).

After calculating the maximum connection amount, in step S215, the data transfer management device 100 selects other electronic devices (not master device) from the plurality of electronic devices 200 according to the maximum connection amount, wherein the amount of the plurality of slave devices is equal to the maximum connection amount. For example, as in the above example, the calculated maximum connection amount is 7, and the maximum layer transfer amount is 3. The data transfer management device 100 selects a plurality of slave devices having the same total amount as the maximum connection amount based on the maximum connection amount. For example, since the maximum connection amount is 7, the data transfer management device 100 selects seven electronic devices from the plurality of electronic devices 200 as slave devices. In the present embodiment, the data transfer management device 100 selects seven electronic devices 220(1) to 220(7) having better connection quality from the electronic devices 220(1) to 220(8) as slave devices. The slave devices may be used to build the topological architecture with the master device 210. The present invention does not limit the manner in which the data transfer management device 100 selects the seven slave devices. For example, in another embodiment, the data transfer management device 100 may be configured in accordance with other predetermined rules set by the manufacturer (e.g., the master device specifies the slave devices itself; the order in which the electronic devices registered to the data transfer management device; the priority order of the electronic devices) to select seven electronic devices as the slave devices.

After determining the master device 210 and the slave devices 220(1)-220(7), in step S217, the data transfer management device 100 divides the master device into the transmitting node queue, and arranges a plurality of slave devices into the receiving node queue in sequence. Next, in step S219, the data transfer management device 100 builds a plurality of layers of the topology architecture and sets a plurality of layer transfer corresponding to the plurality of layers in accordance with the transmitting node queue and the receiving node queue. Steps S217 and S219 will be described in detail below with reference to FIGS. 3A to 5B.

FIG. 3A is a schematic diagram for setting a first layer transfer according to an embodiment of the invention. FIG. 3B is a schematic diagram illustrating a built topology architecture corresponding to the first layer data transfer according to an embodiment of the invention. Referring to FIG. 3A, it is assumed that the electronic device 210 is the master device M1 and is divided into the transmitting node queue. The electronic devices 220(1) to 220(7) are sequentially arranged into the receiving node queue, and the electronic device 220(1) is the first slave device S1; the electronic device 220(2) is the second slave device S2; the electronic device 220(3) is the third slave device S3; the electronic device 220(4) is the fourth slave device S4; the electronic device 220(5) is the fifth slave device S5; the electronic device 220(6) is the sixth slave device S6; the electronic device 220(7) is the seventh slave device S7. The transmitting node queue and the receiving node queue are logical, not referring to the physical position of the arrangement order of the devices, and the transmitting node queue and the receiving node queue are information established for the data transfer management device 100 to set layer transfers more conveniently.

Referring to FIGS. 3A and 3B, in the present embodiment, at the beginning, the data transfer management device 100 sets a first layer transfer (LT1), wherein the data transfer management device 100 sets a first layer node (LN1) in the first layer (L1) of the topology architecture, and divides an electronic device being the first layer node. Then, after the data transfer is started, the first layer node belonging to the first layer receives data from a parent node to which the first layer node is connected. It should be noted that the layer to which the root node belongs can be referred to as the zero layer.

Specifically, the data transfer management device 100 correspondingly selects the devices in the receiving node queue according to the arrangement order of the devices in the transmitting node queue. In addition, the data transfer management device 100 selects slave device from the forefront of the receiving node queue according to the number of devices in the transmitting node queue. The selected slave device is then set to receive the data sent by the corresponding device in transmitting node queue. For example, referring to FIG. 3A, the number of devices in the current transmitting node queue is one, and the data transfer management device 100 selects one slave device from the forefront of the receiving node queue. That is, the data transfer management device 100 selects the first slave device S1 as the slave device corresponding to the master device M1. And, the data transfer management device 100 sets the master device M1 to be connected to the first slave device S1, and during the first layer transfer, the master device M1 transfers data to the first slave device S1. In addition, the data transfer management device 100 sets the first slave device S1 to be the first layer node LN1 of the first layer L1. As a result, the setting of the first layer transfer LT1 is completed.

Referring to 3B, after the first layer transfer is set, the topology architecture is depicted as in FIG. 3B, the master device M1 is the root node RN, and the first slave device S1 is the first node LN1 in the first layer L1. The root node RN of the master device M1 is connected to the first node LN1 of the first slave device S1.

In addition, after the first layer transfer is set, the data transfer management device 100 updates the transmitting node queue and the receiving node queue. Specifically, the data transfer management device 100 moves the device being the first layer node from the receiving node queue into the transmitting node queue and behind the last device in the current transmitting node queue. In addition, the devices that are not moved in the receiving node queue will be moved forward to correspond to the devices in the transmitting node queue. For example, in the above-described example, after setting the first layer transfer, the data transfer management device 100 moves the first slave device S1 into the transmitting node queue and arranges it behind the master device M1, and the not moved slave devices S2 to S7 will be moved forward. Then, the data transfer management device 100 starts setting the second layer transfer LT2 after the said moving of the devices are completed (after updating the transmitting node queue and the receiving node queue).

FIG. 4A is a schematic diagram for setting a second layer transfer according to an embodiment of the invention. FIG. 4B is a schematic diagram illustrating a built topology architecture corresponding to the second layer data transfer according to an embodiment of the invention.

Referring to FIG. 4A, the updated transmitting node queue and the receiving node queue are illustrated in FIG. 4A. Here, the master device M1 corresponds to the second slave device S2, and the master device M1 and the second slave device S2 are first-order devices in the transmitting node queue and receiving node queue respectively. In addition, the first slave device S1 corresponds to the third slave device S3, that is, the first slave device S1 and the third slave device S3 are all second-order devices in the transmitting node queue and receiving node queue respectively.

Next, the data transfer management device 100 sets the second layer of the topology architecture and the second layer transfer of the corresponding second layer according to the (updated) transmitting node queue and the receiving node queue. For example, referring to FIG. 4A, the number of devices in the current transmitting node queue is two, and the data transfer management device 100 selects two slave devices starting from the forefront of the receiving node queue. That is, according to the arrangement order of the devices in the transmitting node queue and the receiving node queue, the data transfer management device 100 selects the second slave device S2 as the slave device corresponding to the master device M1 and selects the third slave device S3 as the slave device corresponding to the first slave device S1. The data transfer management device 100 sets the master device M1 to be connected to the second slave device S2, and sets the first slave device S1 to be connected to the third slave device S3. In addition, the data transfer management device 100 sets that the master device M1 transfers data to the connected second slave device S2, and the first slave device S1 transfers data to the connected third slave device S3 during the second layer transfer. In addition, the data transfer management device 100 sets the second slave device S2 and the third slave device S3 as the second layer node LN2 of the second layer L2. As a result, the setting of the second layer transfer is completed.

Referring to FIG. 4B, after the second layer transfer is set, the topology architecture is depicted in FIG. 4B, unlike the topology architecture in which the first layer transfer is set, in the topology architecture depicted in FIG. 4B, the root node RN of the master device M1 is also connected to the second layer node LN2 of the second slave device S2 and the first layer node LN1 of the first slave device S1 is also connected to the second layer node LN2 of the third slave device S3.

After the second layer transfer is set, the data transfer management device 100 updates the transmitting node queue and the receiving node queue. For example, in the above-described example, after setting the second layer transfer, the data transfer management device 100 moves the second slave device S2 and the third slave device S3 into the transmitting node queue and arranges them behind the first slave device S1 sequentially, and the slave devices S4 to S7 will be moved forward. Then, the data transfer management device 100 starts to set the third layer transfer after the said moving is completed (after updating the transmitting node queue and the receiving node queue).

Figures 5A, 5B:
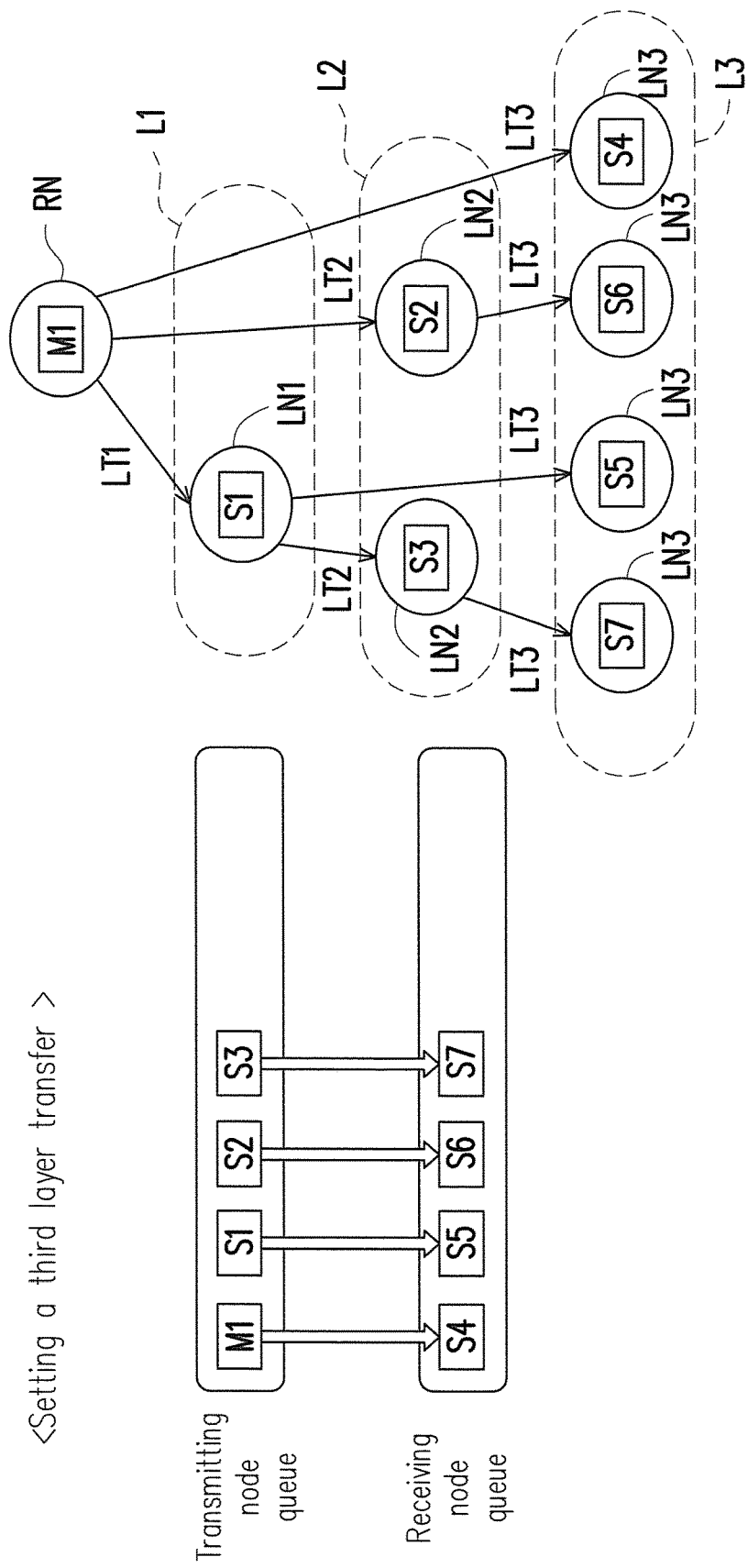
FIG. 5A is a schematic diagram for setting a third layer transfer according to an embodiment of the invention.
FIG. 5B is a schematic diagram illustrating a built topology architecture corresponding to the third layer data transfer according to an embodiment of the invention.

FIG. 5A is a schematic diagram for setting a third layer transfer according to an embodiment of the invention. FIG. 5B is a schematic diagram illustrating a built topology architecture corresponding to the third layer data transfer according to an embodiment of the invention.

Referring to FIG. 5A, the updated transmitting node queue and the receiving node queue are depicted in FIG. 5A. The master device M1 corresponds to the fourth slave device S4, i.e., the master device M1 and the fourth slave device S4 are the first-order devices in the transmitting node queue and receiving node queue respectively. The first slave device S1 corresponds to the fifth slave device S5, i.e., the first slave device S1 and the fifth slave device S5 are the second-order devices in the transmitting node queue and receiving node queue respectively. The second slave device S2 corresponds to the sixth slave device S6, i.e., the second slave device S2 and the sixth slave device S6 are third-order devices in the transmitting node queue and receiving node queue respectively. the third slave device S3 corresponds to the seventh slave device S7, i.e., the third slave device S3 and the seventh slave device S7 are the fourth-order devices in the transmitting node queue and receiving node queue respectively.

Next, the data transfer management device 100 sets the third layer of the topology architecture and the third layer transfer corresponding to the third layer according to the (updated) transmitting node queue and the receiving node queue. For example, referring to FIG. 5A, the number of devices in the current transmitting queue is four, and the data transfer management device 100 selects four slave devices starting from the forefront of the receiving node queue. That is, according to the arrangement order of the devices in the transmitting node queue and the receiving node queue, the data transfer management device 100 selects the fourth slave device S4 as the slave device corresponding to the master device M1, selects the fifth slave device S5 as the slave device corresponding to the first slave device S1, selects the sixth slave device S6 as the slave device corresponding to the second slave device S2 and selects the seventh slave device S7 as the slave device corresponding to the third slave device S3. The data transfer management device 100, according to the corresponding relationship, sets the master device M1 to be connected to the fourth slave device S4, the first slave device S1 to be connected to the fifth slave device S5, and the second slave device S2 to be connected to the sixth slave device S6, and the third slave device S3 to be connected to the seventh slave device S7. In addition, the data transfer management device 100 may set that, during the third layer transfer, the master device M1 transfers data to the fourth slave device S4, the first slave device S1 transfers the data to the fifth slave device S5, the second slave device S2 transfers the data to the sixth slave device S6, and the third slave device S3 transfers the data to the seventh slave device S7. In addition, the data transfer management device 100 sets the fourth slave device, the fifth slave device, the sixth slave device, and the seventh slave device as the third layer nodes of the third layer of the topology architecture. As a result, the setting of the third layer transfer is completed.

Referring to FIG. 5B, after the third layer transfer is set, the topology architecture is depicted in FIG. 5B, unlike the topology architecture in which the second layer transfer is set, in the topology architecture depicted in FIG. 5B, the root node RN of the master device M1 is also connected to the third layer node LN3 of the fourth slave device S4, the first layer node LN1 of the first slave device S1 is also connected to the third layer node LN3 of the fifth slave device S5, The second layer node LN2 of the second slave device S2 is also connected to the third layer node LN3 of the sixth slave device S6 and the second layer node LN2 of the third slave device S3 is also connected to the third layer node LN3 of the seventh slave device S7.

Since the maximum layer transfer amount is three, it is known that, in this embodiment, the total amount of layers of the topology architecture built by the data transfer management device 100 is three. That is, the data transfer management device 100 only needs to set the third layer transfer to complete the building of the topology architecture. In other words, in response to all of the selected slave devices have been set as the nodes of the topology architecture, the building of the topology architecture has been completed.

Back to FIG. 2, upon completion of building the topology architecture, in step S220, the data transfer management device 100 indicates the master device and the slave device to perform a transfer operation corresponding to the data according to the built topology architecture. Specifically, after the synchronous data transfer is started, the data transfer management device 100 indicates (instructs) the master device and the slave devices to perform the first layer transfer, the second layer transfer and the third layer transfer according to the topology architecture, wherein the second layer transfer is performed in response to the first layer transfer is completed, and the third layer transfer is performed in response to the second layer transfer is completed. The following will be further illustrated with reference to FIG. 6.

FIG. 6 is a schematic diagram illustrating a data transfer operation according to an embodiment of the invention.

Referring to FIG. 6, in the above-described example, transmitting nodes of the first layer transfer, the second layer transfer and the third layer transfer are the master device M1, the first slave device S1, the second slave device S2, and the third slave device S3. As shown in FIG. 6, the time below is used to represent the order of performing layer transfers, where the first layer transfer LT1 starts at time $t_0$ and finishes at time $t_1$; the second layer transfer LT2 starts at time $t_1$ and finishes at time $t_2$; The third layer transfer LT3 starts at time $t_2$ and finishes at time $t_3$.

In addition, as shown in FIG. 6 (referring the arrow in FIG. 6), in the first layer transfer LT1, the master device M1 belonging to the transmitting node transfers data to the first slave device S1 belonging to the receiving node; in the second layer transfer LT2, the master device M1 belonging to the transmitting node transfer data to the second slave device S2 belonging to the receiving node, and the first slave device S1 belonging to the transmitting node transfers data to the third slave device S3 belonging to the receiving node; in the third layer transfer LT3, the master device M1 belonging to the transmitting node transfers data to the fourth slave device S4 belonging to the receiving node, the first slave device S1 belonging to the transmitting node transfers data to the fifth slave device S5 belonging to the receiving node, the second slave device S2 belonging to the transmitting node transfers data to the sixth slave device S6 belonging to the receiving node, and the third slave device S3 belonging to the transmitting node transfers data to the seventh slave device S7 belonging to the receiving node. In another aspect, the slave device S1 belonging to the first layer node of the first layer receives the data at the time for performing the first layer transfer (during the first layer transfer). And so on, the slave devices S2 and S3 belonging to the second layer nodes of the second layer receive the data at the time for performing the second layer transfer, and the slave devices S4, S5, S6 and S7 belonging to the third layer nodes of the third layer receive the data at the time for performing the third layer transfer.

Assuming that the time spent for every layer transfer is equally and which is the foregoing first transfer time (e.g., the time length from time $t_0$ to time $t_1$ is the same as the time length from time $t_1$ to time $t_2$, and the time length from $t_1$ to time $t_2$ is the same as the time length from time $t_2$ to time $t_3$), in the present embodiment, the total time (e.g., $t_3$-$t_0$) spent for three layer transfers is equal to three times the first transfer time, and the total time spent for three layer transfers may be less than the tolerance time.

An embodiment of the present invention also provides a method of repairing a topology architecture to maintain the overall operation of the built topology architecture after a device of some node of the built topology architecture losing the connection (e.g., the connection has error, or the connection is interrupted), as to continue performing the synchronous data transfer. Hereinafter, the topology architecture repairing method provided by the present invention will be described with reference to a plurality of figures and embodiments.

Figure 7A:
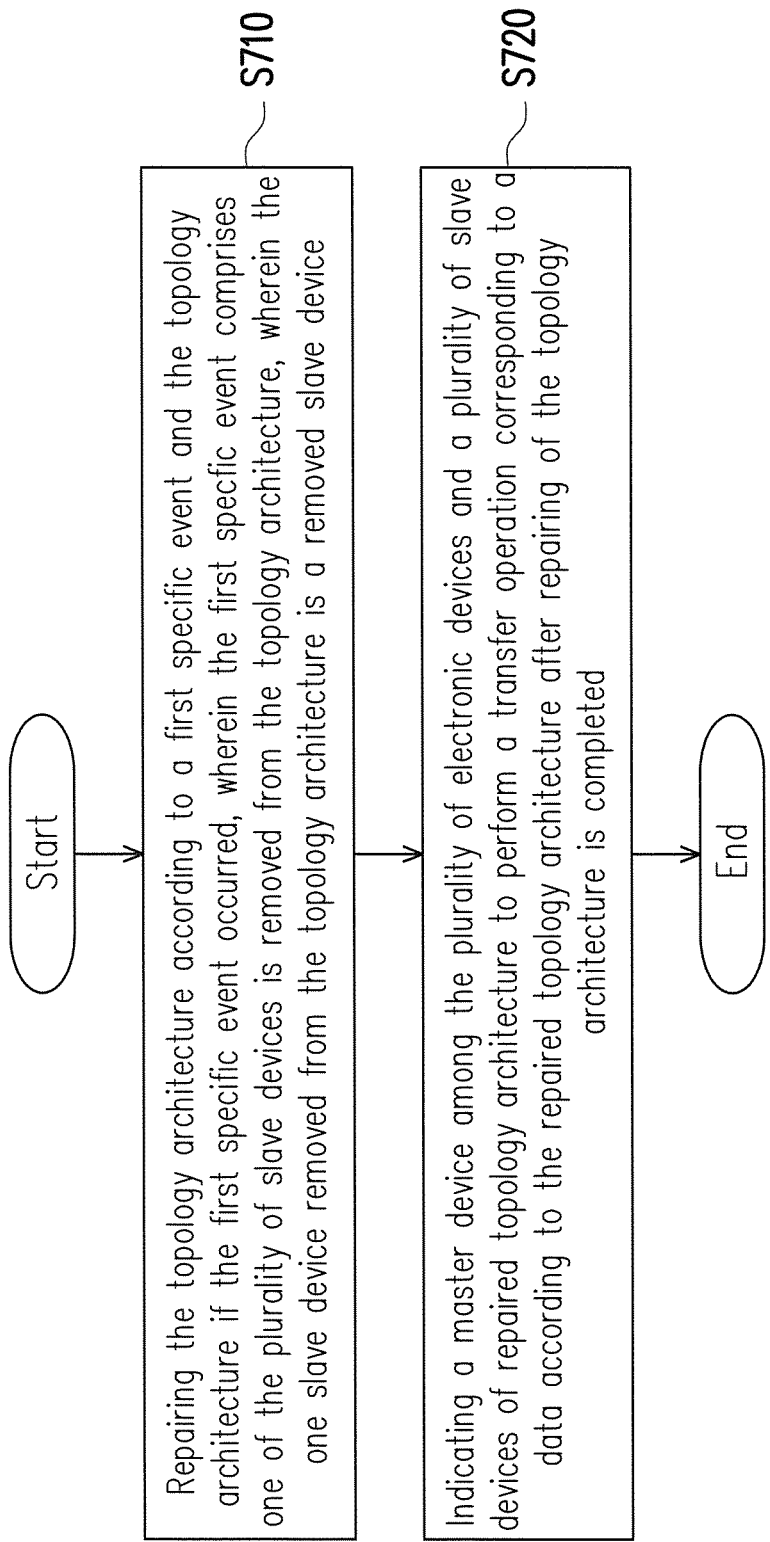
FIG. 7A is a flowchart illustrating a topology architecture repairing method according to an embodiment of the invention.

FIG. 7A is a flowchart illustrating a topology architecture repairing method according to an embodiment of the invention.

Referring to FIG. 7A, in step S710, repairing the topology architecture according to a first specific event and the topology architecture if the first specific event occurred, wherein the first specific event includes that one of the plurality of slave devices is removed from the topology architecture, wherein the one slave device removed from the topology architecture is a removed slave device. In particular, in the present embodiment, the first specific event is that a device of one of the nodes other than the root node in the topology architecture loses connection, which may also be considered as the said removed slave device is removed from the topology architecture.

Figure 7B:
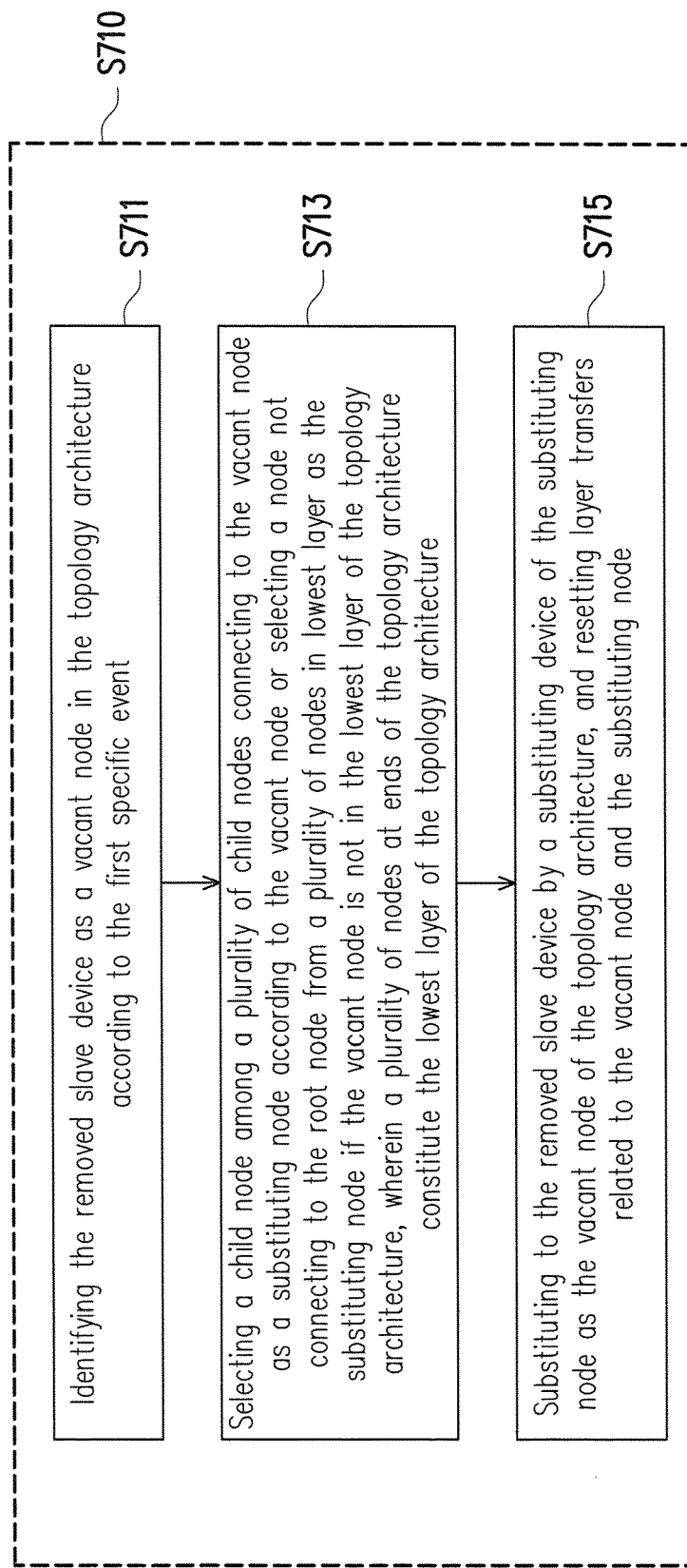
FIG. 7B is a flowchart of a step for repairing the topology architecture according to a first specific event and the topology architecture according to an embodiment of the invention.

FIG. 7B is a flowchart of a step for repairing the topology architecture according to a first specific event and the topology architecture according to an embodiment of the invention. Referring to FIG. 7B, step S710 includes step S711, S713 and S715.

In step S711, the data transfer management device 100 identifies the removed slave device as a vacant node in the topology architecture according to the first specific event.

Next, in step S713, the data transfer management device 100 selects a child node among a plurality of child nodes connecting to the vacant node as a substituting node according to the vacant node or selecting a node not connecting to the root node from a plurality of nodes in lowest layer as the substituting node if the vacant node is not in the lowest layer of the topology architecture, wherein a plurality of nodes at ends of the topology architecture constitute the lowest layer of the topology architecture. In the present embodiment, the topology architecture has the zero layer (having the root node), the first layer, the second layer and the third layer, wherein the lowest layer is the third layer. Furthermore, the third layer nodes of the third layer as the lowest layer of the topology architecture are the leaf nodes of the topology architecture, too. The data transfer management device 100 may determine how to repair the topology architecture according to the position of the vacant node.

Next, in step S715, the data transfer management device 100 may substitute to the removed slave device by a substituting slave device of the substituting node as the vacant node of the topology architecture, and resetting layer transfers related to the vacant node and the substituting node. Specifically, after selecting the substitute node, the data transfer management device 100 makes the slave device being the substituting node as the substituting slave device, and uses the substituting slave device to replace the removed slave device to substitute into the position of the vacant node. Next, the data transfer management device 100 resets the layer transfers associated with the substitute node/vacant node. The topology architecture repairing method provided by the present invention will be described below with reference to FIGS. 8A to 9D.

Figures 8A, 8B:
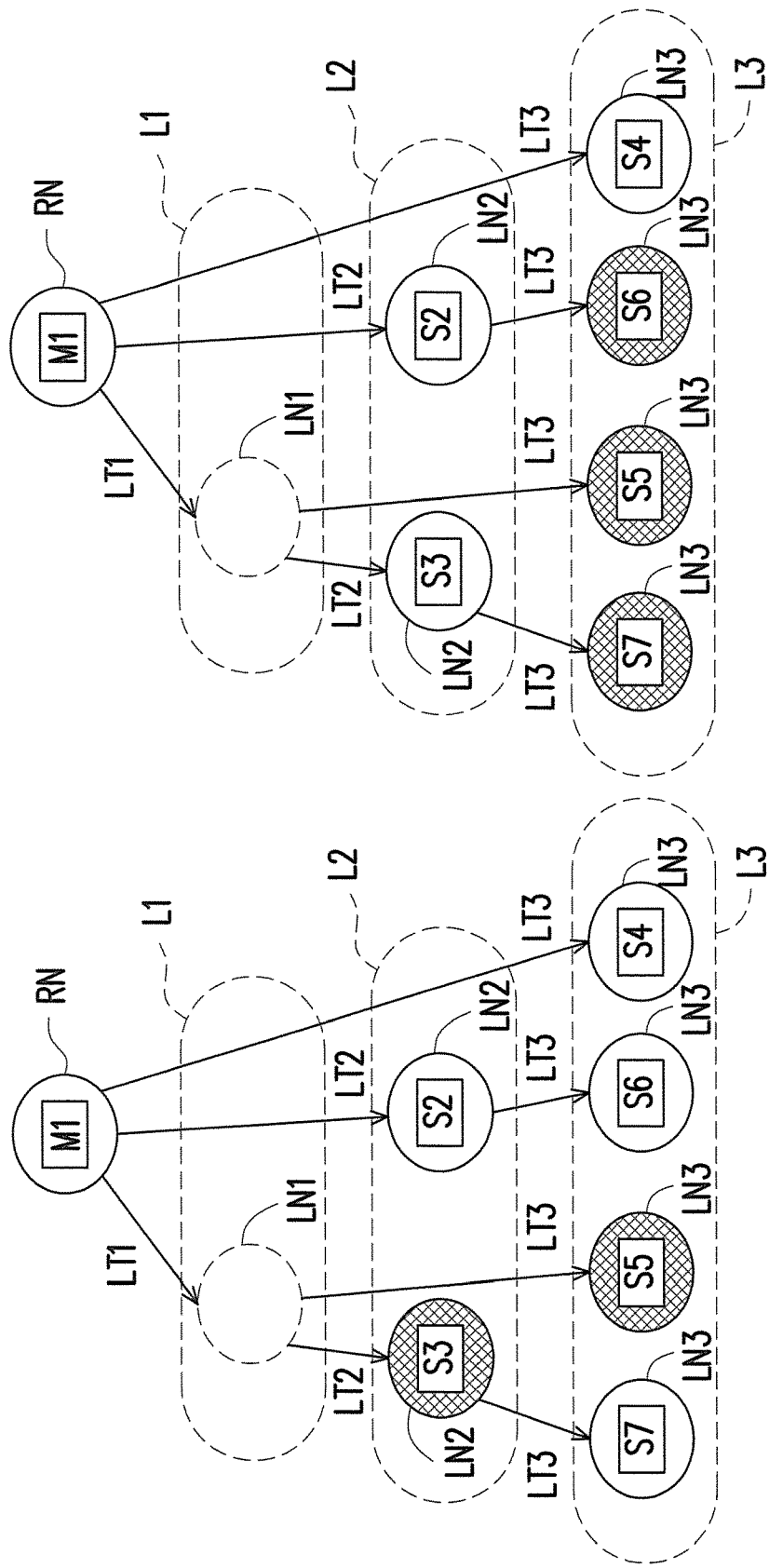
FIG. 8A, 8B are schematic diagrams for selecting a substituting node according to an embodiment of the invention.

FIG. 8A, 8B are schematic diagrams for selecting a substituting node according to an embodiment of the invention.

Referring to FIGS. 8A and 8B, assuming that the first slave device S1 is disconnected and removed from the topological architecture, and the first layer node LN1 of the first slave device S1 becomes a vacant node (as illustrated by a dotted line circle). In the present embodiment, the data transfer management device 100 has different repairing ways depending on whether the vacant node is at the lowest layer of the topology architecture. Specifically, in the present embodiment, the data transfer management device 100 selects, from child node(s) connecting to the vacant node (e.g., nodes (being slave device S3 or S5) illustrated by a diamond-shaped grid line in FIG. 8A), a child node as the substituting node in response to the vacant node is determined not at the lowest layer of the topology architecture. Alternatively, the data transfer management device 100 selects, from the lowest layer of the topology architecture, one node not directly connected to the root node (e.g., nodes illustrated by a rhombic grid line in FIG. 8B) as a substituting node. It should be noted that if the lowest layer of the topology architecture has only one node connected to the root node and the data transfer management device would like to select node from the lowest layer, then this node will be selected as the substituting node, and the device of the substituting node will be treated as a substituting slave device. In other words, when selecting a substituting node from the lowest layer of the topology architecture, the node directly connected to the root node is the last choice (when other nodes in the lowest layer are unavailable, the node directly connected to the root node would be selected).

Figure 9B:
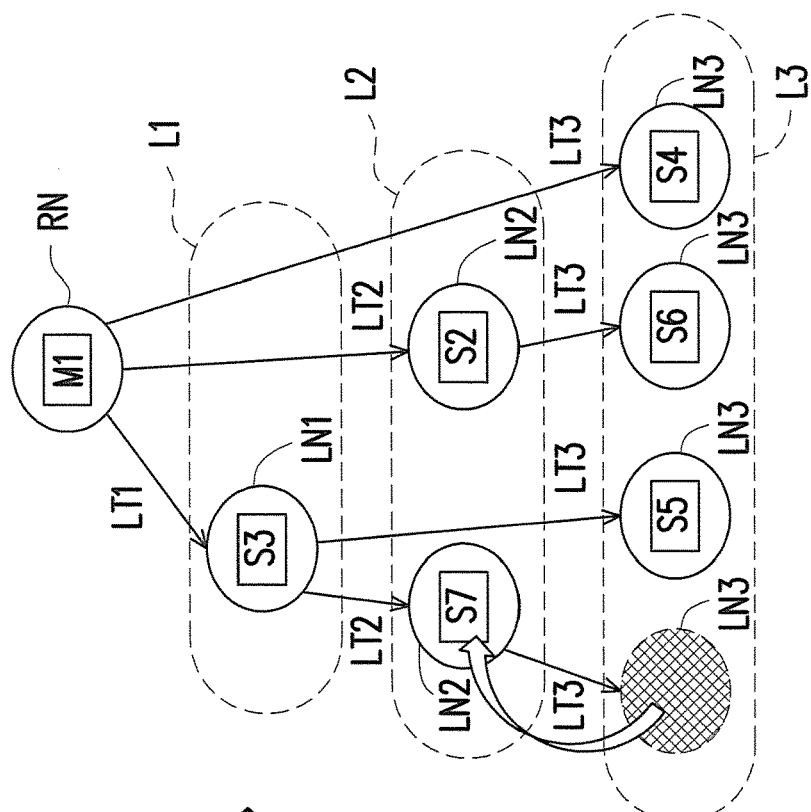
FIGS. 9A, 9B and 9C are schematic diagrams for resetting layer transfers related to a vacant node and a substituting node according to an embodiment of the invention.
Figure 9A:
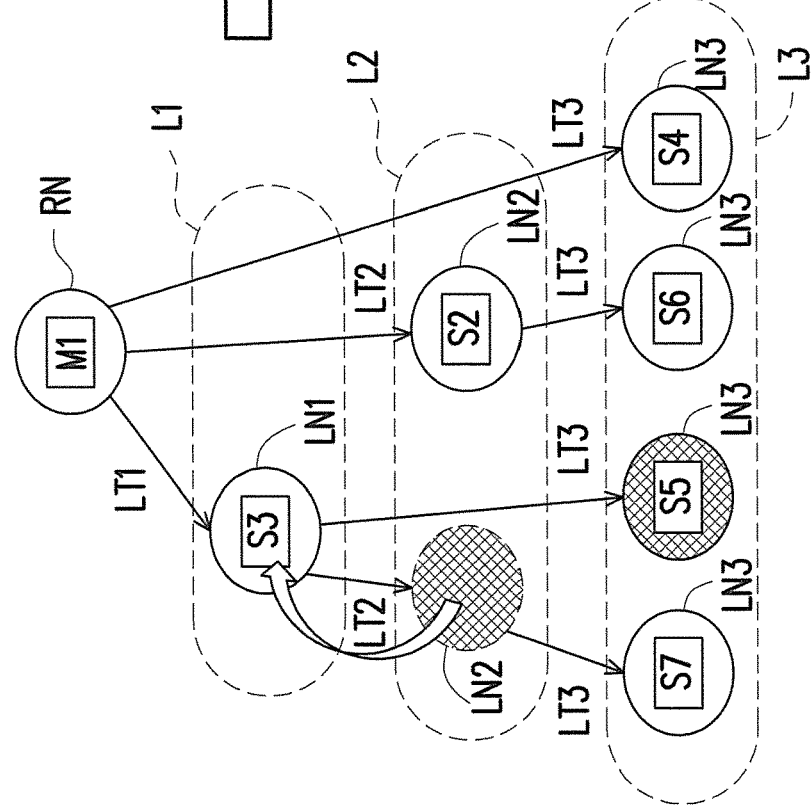
Figure 9C:
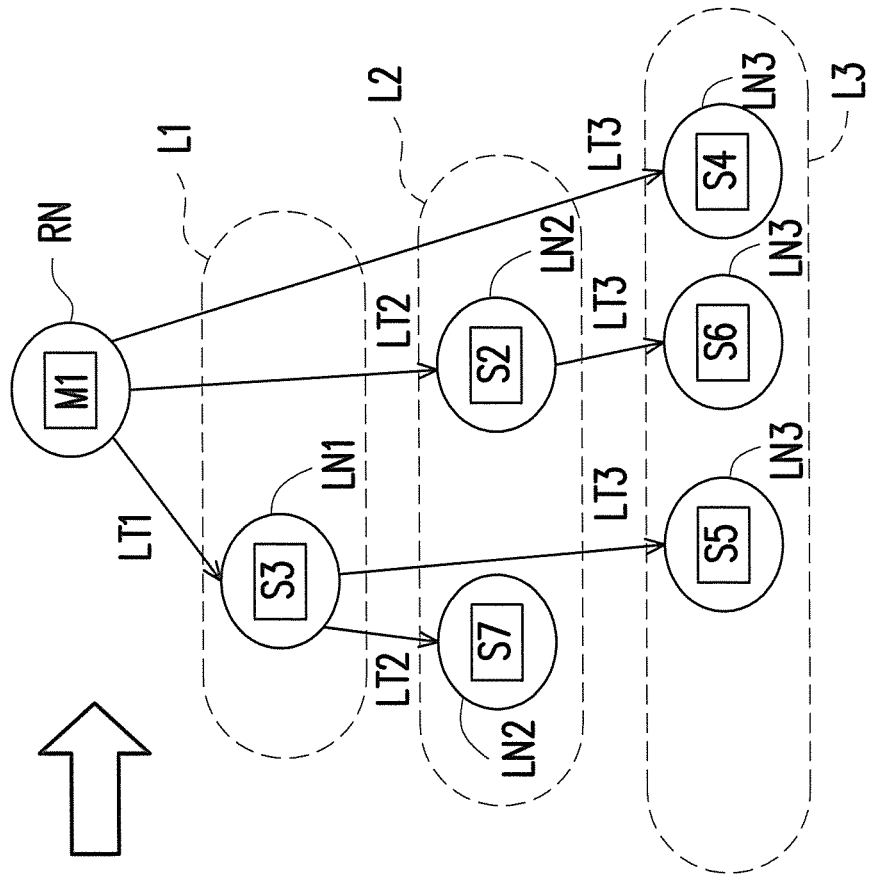

FIGS. 9A, 9B and 9C are schematic diagrams for resetting layer transfers related to a vacant node and a substituting node according to an embodiment of the invention.

Referring to FIG. 9A, the example in FIG. 9A is continuing the example in FIG. 8A, it assuming that the first slave device S1 is removed and the data transfer management device 100 selects the third slave device S3 of the second layer as the substituting node (as shown by a diamond shaped grid) in step S713. As shown by the arrow in FIG. 9A, the third slave device S3 becomes the substituting slave device, and the third slave device S3 replaces the original first slave device as the slave device of the vacant node.

Thus, according to the topology architecture, the data transfer management device 100 resets the layer transfers related to the vacant node and the substituting node. For example, according to the topology architecture, the data transfer management device 100 sets the master device M1 to be connected to the third slave device S3, and during the operation of performing the first layer transfer LT1, the master device M1 transfers data to the third slave device S3. In addition, the data transfer management device 100 sets the third slave device S3 to be connected to the fifth slave device S5, and the third slave device S3 transfers the data to the fifth slave device S5 during the third layer transfer LT3.

Next, the data transfer management device 100 determines other layer transfer(s) related to the second layer node of the original third slave device. For example, referring to FIG. 9B, the third node LN3 of the seventh slave device S7 connected to the second node LN2 of the original third slave device S3 may be affected by the movement of the third slave device S3. Therefore, as shown by the arrow, the seventh slave device S7 directly substitutes for the third slave device S3 and becomes the second layer node LN2 (of the original third slave device). Then, according to the current topology architecture, the data transfer management device 100 sets the third slave device S3 to be connected to the seventh slave device S7, and in the second layer transfer LT2, the third slave device S3 transfers the data to the seventh slave device S7. As a result, all the affected nodes have been set up (as shown in FIG. 9C), and the repairing of the topology architecture is completed.

Back to FIG. 7A, in step S720, after repairing of the topology architecture is completed, the data transfer management device 100 indicates the master device among the plurality of electronic devices and a plurality of slave devices of repaired topology architecture to perform a transfer operation corresponding to a data according to the repaired topology architecture.

Figure 9D:
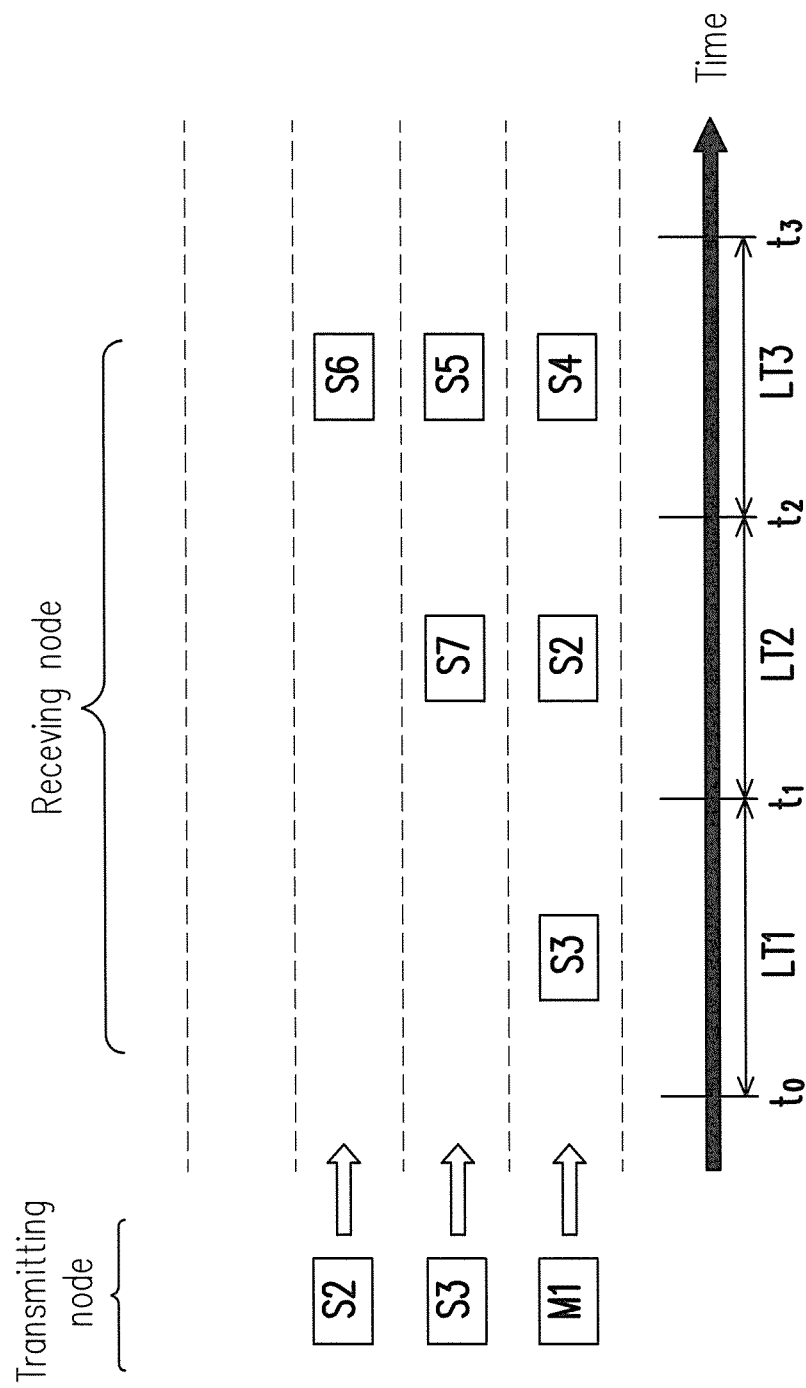
FIG. 9D is a schematic diagram illustrating a data transfer of a repaired topology architecture according to an embodiment of the invention.

FIG. 9D is a schematic diagram illustrating a data transfer of a repaired topology architecture according to an embodiment of the invention.

Referring to FIG. 9D, assuming the repaired topology architecture is like FIG. 9C illustrated, continuing the foregoing example, the transmitting nodes of the first layer transfer, the second layer transfer and the third layer transfer may be the master device M1, the third slave device S3 and the second slave device S2. Similar to the description of FIG. 6, the time below is used to represent the order of performing layer transfers, where the first layer transfer LT1 starts at time $t_0$ and finishes at time $t_1$; the second layer transfer LT2 starts at time $t_1$ and finishes at time $t_2$; The third layer transfer LT3 starts at time $t_2$ and finishes at time $t_3$.

Referring to FIG. 9D, as shown in FIG. 9D (referring the arrow in FIG. 9D), in the first layer transfer LT1, the master device M1 belonging to the transmitting node transfers data to the third slave device S3 belonging to the receiving node; in the second layer transfer LT2, the master device M1 belonging to the transmitting node transfer data to the second slave device S2 belonging to the receiving node, and the third slave device S3 belonging to the transmitting node transfers data to the seventh slave device S7 belonging to the receiving node; in the third layer transfer LT3, the master device M1 belonging to the transmitting node transfers data to the fourth slave device S4 belonging to the receiving node, the third slave device S3 belonging to the transmitting node transfers data to the fifth slave device S5 belonging to the receiving node, and the second slave device S2 belonging to the transmitting node transfers data to the sixth slave device S6 belonging to the receiving node. Comparing to FIG. 6, the third slave device S3 replace the original first slave device to perform the corresponding layer transfers. And, after the seventh slave device S7 being adjusted (being moving to the second layer), the corresponding layer transfer would be set, too.

In the present embodiment, as described above, the data transfer management device 100 may have a different repairing ways depending on whether the vacant node is in the lowest level of the topological architecture. The way for repairing the topology architecture in response to the vacant node being in the lowest layer of the topology architecture will be described below with reference to FIGS. 10A to 10C.

Figure 10B:
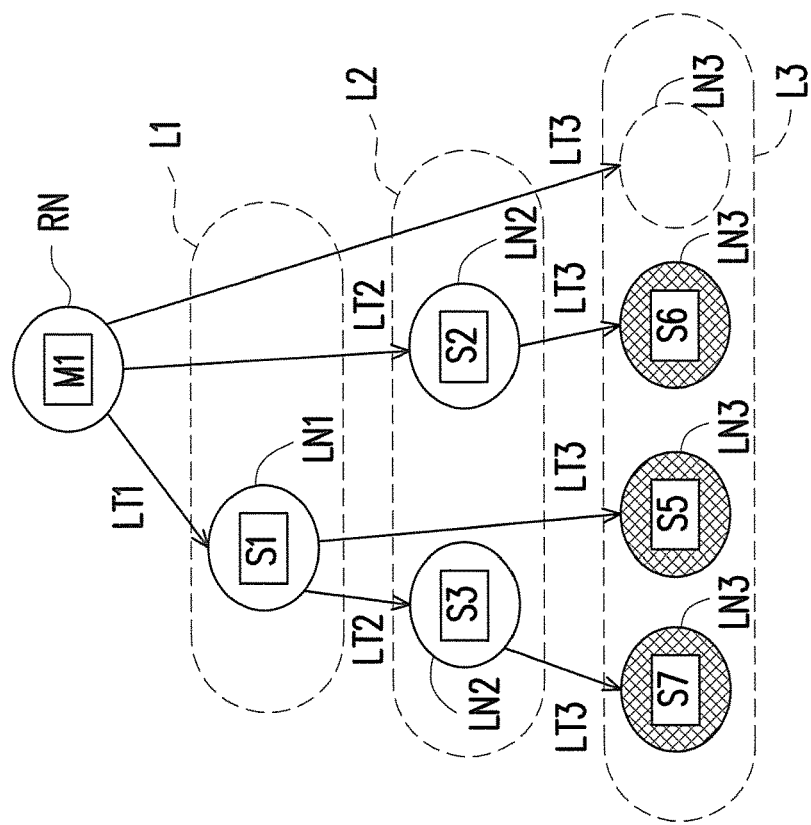
FIGS. 10A, 10B and 10C are schematic diagrams illustrating a vacant node and a substituting node according to an embodiment of the invention.
Figure 10A:
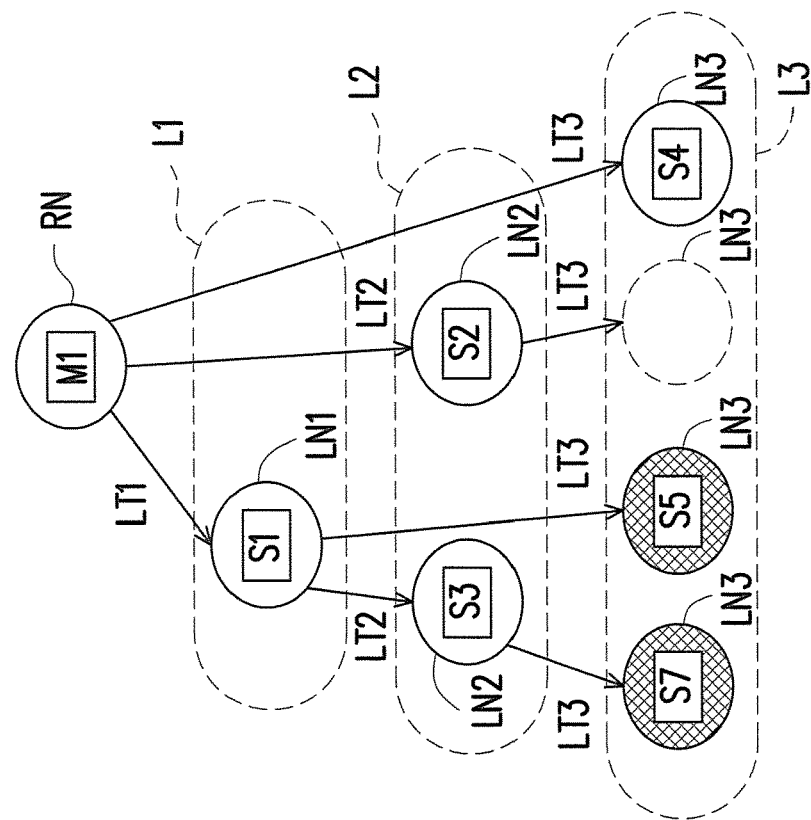
Figure 10C:
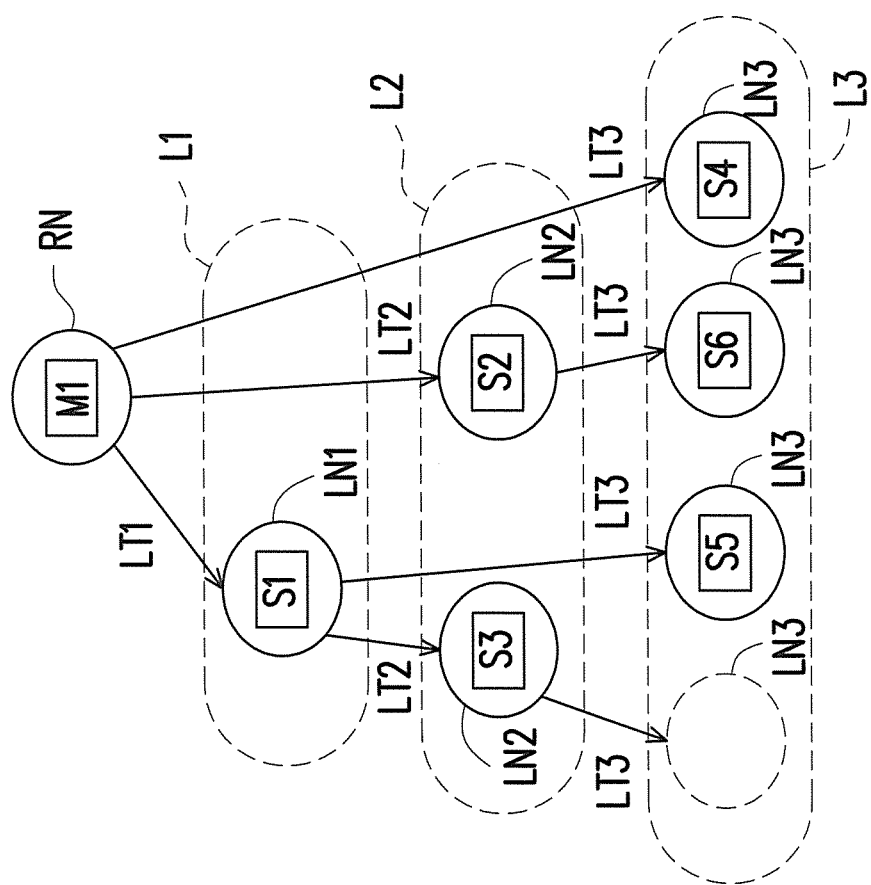

FIGS. 10A, 10B and 10C are schematic diagrams illustrating a vacant node and a substituting node according to an embodiment of the invention. Referring to FIG. 10A, it is assumed that the sixth slave device S6 is the removed slave device, and the third layer node of the sixth slave device S6 becomes the vacant node (as indicated by a dotted line circle). In this example, the data transfer management device 100 may select a node not directly connected to the root node (e.g., nodes indicated by a rhombic grid line in FIG. 10A) from a plurality of nodes in the lowest layer of the topological architecture as a substituting node. For example, the fifth slave device S5 may be used as a substituting slave device or the seventh slave device S7 may be used as a substituting slave device.

Referring to FIG. 10B, similarly, it is assumed that the third layer node of the fourth slave device directly connected to the root node RN becomes a vacant node (as indicated by a dotted line circle). In this example, the data transfer management device 100 needs to select one node as a substituting node from other nodes (e.g., nodes indicated by the rhombic grid of FIG. 10B) in the lowest layer of the topology architecture. For example, the fifth slave device S5 may be used as a substituting slave device, the sixth slave device S6 may be used as a substituting slave device, or the seventh slave device S7 may be used as a substituting slave device. In other words, when a leaf node directly connected to the root node becomes the vacant node, a device of other leaf nodes must be selected to substituted into the vacant node.

Further, in another embodiment, the data transfer management device 100 may not perform the repairing of the topology architecture if the vacant node is a leaf node not directly connected to the root node. Referring to FIG. 10C, in this another embodiment, it is assumed that the seventh slave device S7 is removed from the topology architecture, and that the third layer node of the seventh slave device S7 becomes a vacant node (as indicated by a dotted line circle). The data transfer management device 100 would not select other leaf nodes to perform the repairing of the topology architecture. In other words, the data transfer management device 100 can directly set the third slave device not to be connected to the seventh slave device S7, and, during the third layer transfer LT3, the third slave device S3 would not transfer data to the seventh slave device S7.

However, in further another embodiment, if one of the slave device is removed, the data transfer management device 100 may use one of the electronic devices which has not been selected in the electronic device 200 as the substituting slave device to substitute the removed slave device. For example, in this alternative embodiment, the data transfer management device 100 may select the electronic device 220(8) as the substituting slave device and make the electronic device 220(8) as the third layer node LN3 of the original seventh slave device S7.

Figure 11A:
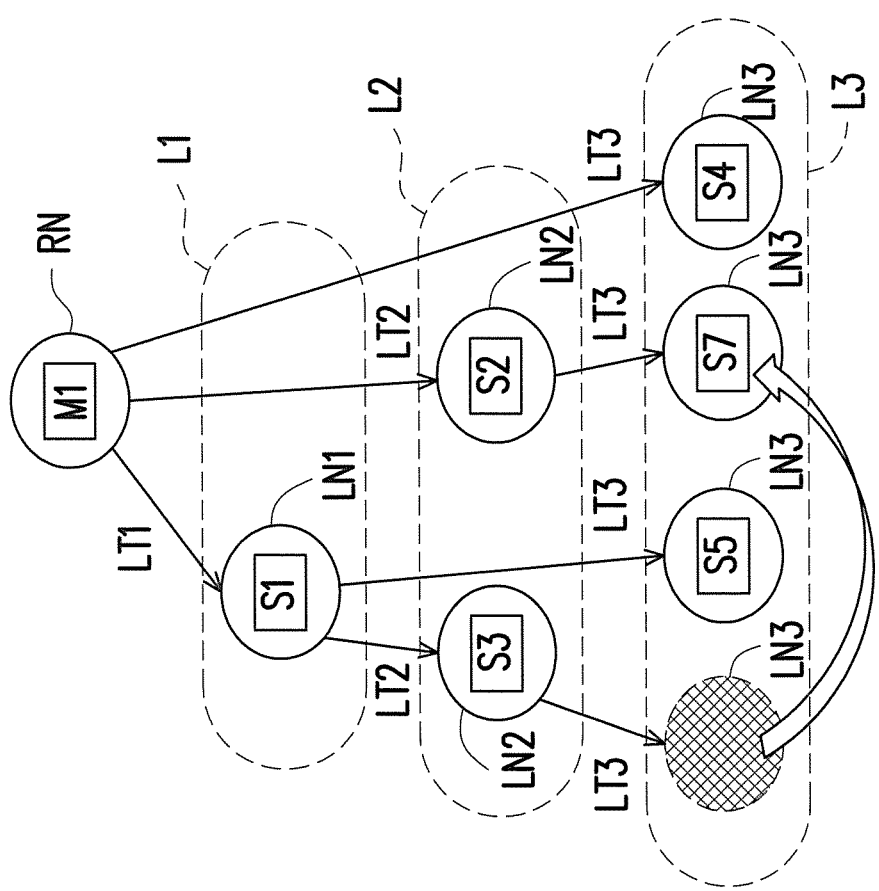
FIG. 11A is a schematic diagram illustrating a repaired topology architecture according to an embodiment of the invention.
Figure 11B:
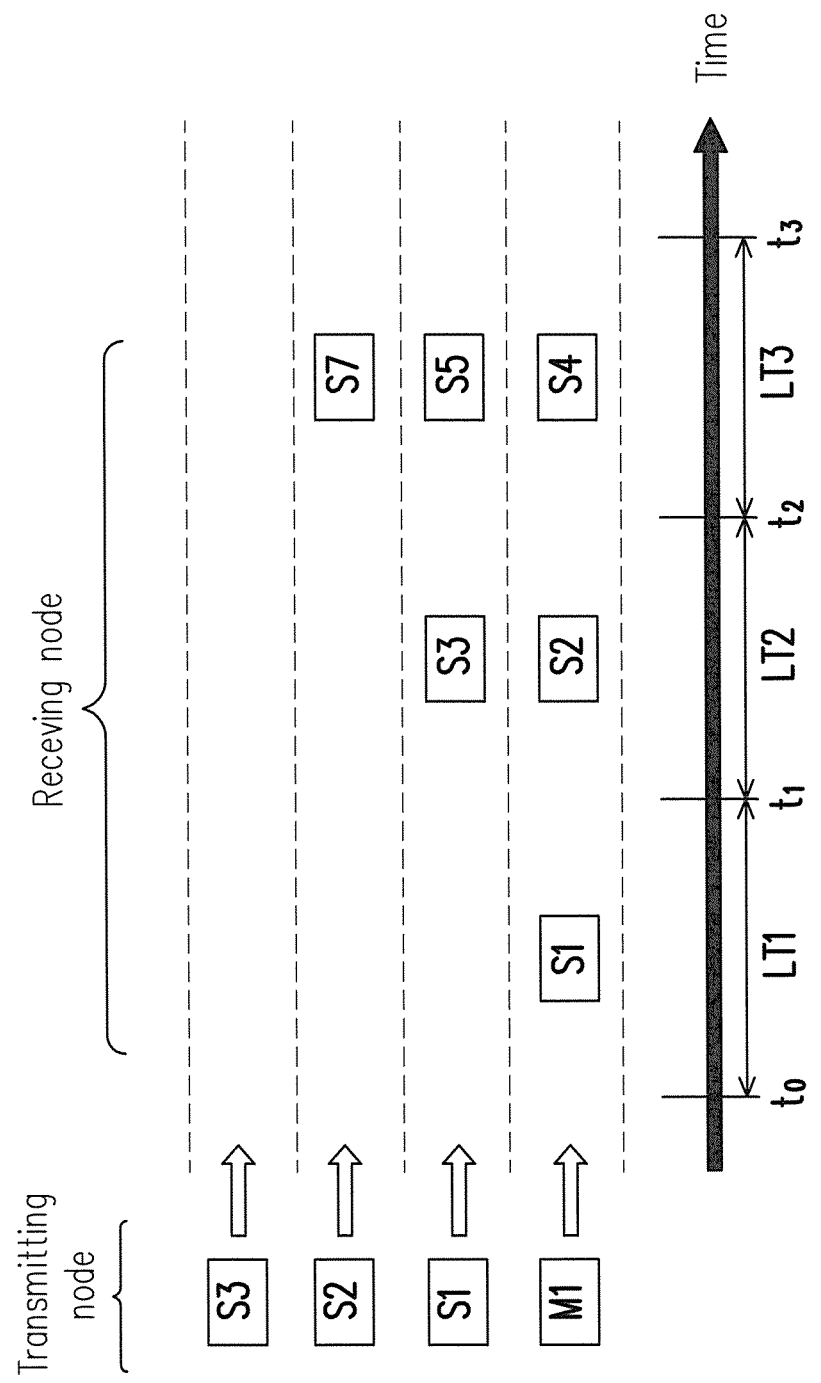
FIG. 11B is schematic diagrams illustrating a data transfer of a repaired topology architecture according to an embodiment of the invention.

FIG. 11A is a schematic diagram illustrating a repaired topology architecture according to an embodiment of the invention. FIG. 11B is schematic diagrams illustrating a data transfer of a repaired topology architecture according to an embodiment of the invention.

Referring to FIG. 11A, it is assumed that, in the example of FIG. 10A (the sixth slave device S6 is removed), the data transfer management device 100 selects the third layer node LN3 of the seventh slave device S7 as a substituting node (as indicated by a dotted line circle), and the repaired topology architecture as shown in FIG. 11A. Referring to FIG. 11B, continuing to the example in FIG. 11A, according to the repaired topology architecture of FIG. 11A, the transmitting nodes of the first layer transfer, the second layer transfer and the third layer transfer may be the master device M1, the first slave device S1, the second slave device S2 and the third slave device S3.

As shown in FIG. 11B (referring the arrow in FIG. 11B), in the first layer transfer LT1, the master device M1 belonging to the transmitting node transfers data to the first slave device S1 belonging to the receiving node; in the second layer transfer LT2, the master device M1 belonging to the transmitting node transfer data to the second slave device S2 belonging to the receiving node, and the first slave device S1 belonging to the transmitting node transfers data to the third slave device S3 belonging to the receiving node; in the third layer transfer LT3, the master device M1 belonging to the transmitting node transfers data to the fourth slave device S4 belonging to the receiving node, the first slave device S1 belonging to the transmitting node transfers data to the fifth slave device S5 belonging to the receiving node, and the second slave device S2 belonging to the transmitting node transfers data to the seventh slave device S7 belonging to the receiving node. Comparing to FIG. 6, the seventh slave device S7 replace the original sixth slave device S6 to perform the corresponding layer transfers. And, after the seventh slave device S7 being adjusted (being moving to the second layer), the corresponding layer transfer would be set, too.

It should be noted that in one embodiment, if a second specific event occurred (in response to a second event is determined occurred), the data transfer management device 100 rebuilds according to another master device and the slave devices in the topology architecture, wherein the second specific event includes that another master device replacing the master device to provide the data; and upon the completion of rebuilding the topology architecture, the data transfer management device 100 indicates the another master device and original slave devices to perform transfer operation corresponding to the data according to the rebuilt topology architecture. In particular, in the present embodiment, the second specific event is that another electronic device replaces the original master device (to provide data).

Figure 12A:
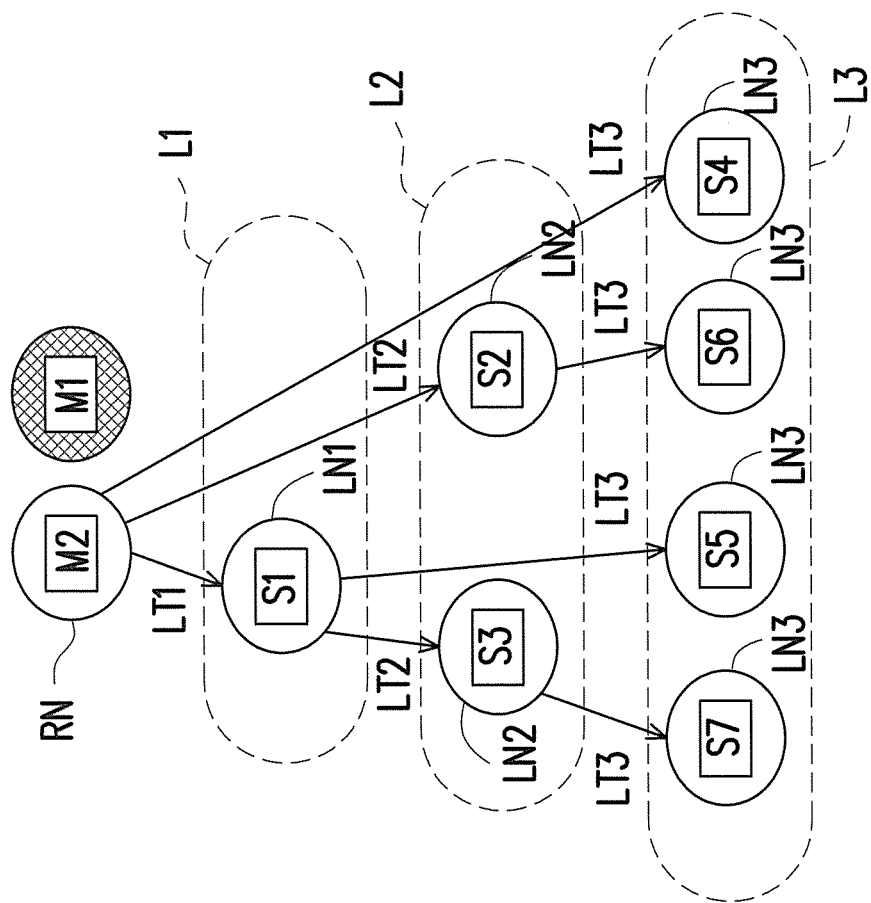
FIG. 12A is a schematic diagram illustrating a rebuilt topology architecture according to an embodiment of the invention.

FIG. 12A is a schematic diagram illustrating a rebuilt topology architecture according to an embodiment of the invention.

Referring to FIG. 12A, for example, after building operation of the topology architecture is completed, if the data transfer management device 100 determines that another master device M2 replaces master device M1 to provide data to the plurality of slave devices of the topology architecture. The data transfer management device 100 directly substitutes the master device M1 by the master device M2 as the root node RN of the topology architecture, and resets the connection relationships and the corresponding layer transfers between the new root node and its child nodes. For example, the data transfer management device 100 may set the master device M2 to be connected to the first slave device S1, the master device M2 to be connected to the second slave device S2, and the master device M2 to be connected to the fourth slave device S4. In addition, the data transfer management device 100 sets that the master device M2 transfers data to the first slave device S1 during the first layer transfer LT1, the master device M2 transfers data to the second slave device S2 during the second layer transfer LT2, and the master device M2 transfers data to the fourth slave device S4 during the third layer transfer LT3.

Figure 12B:
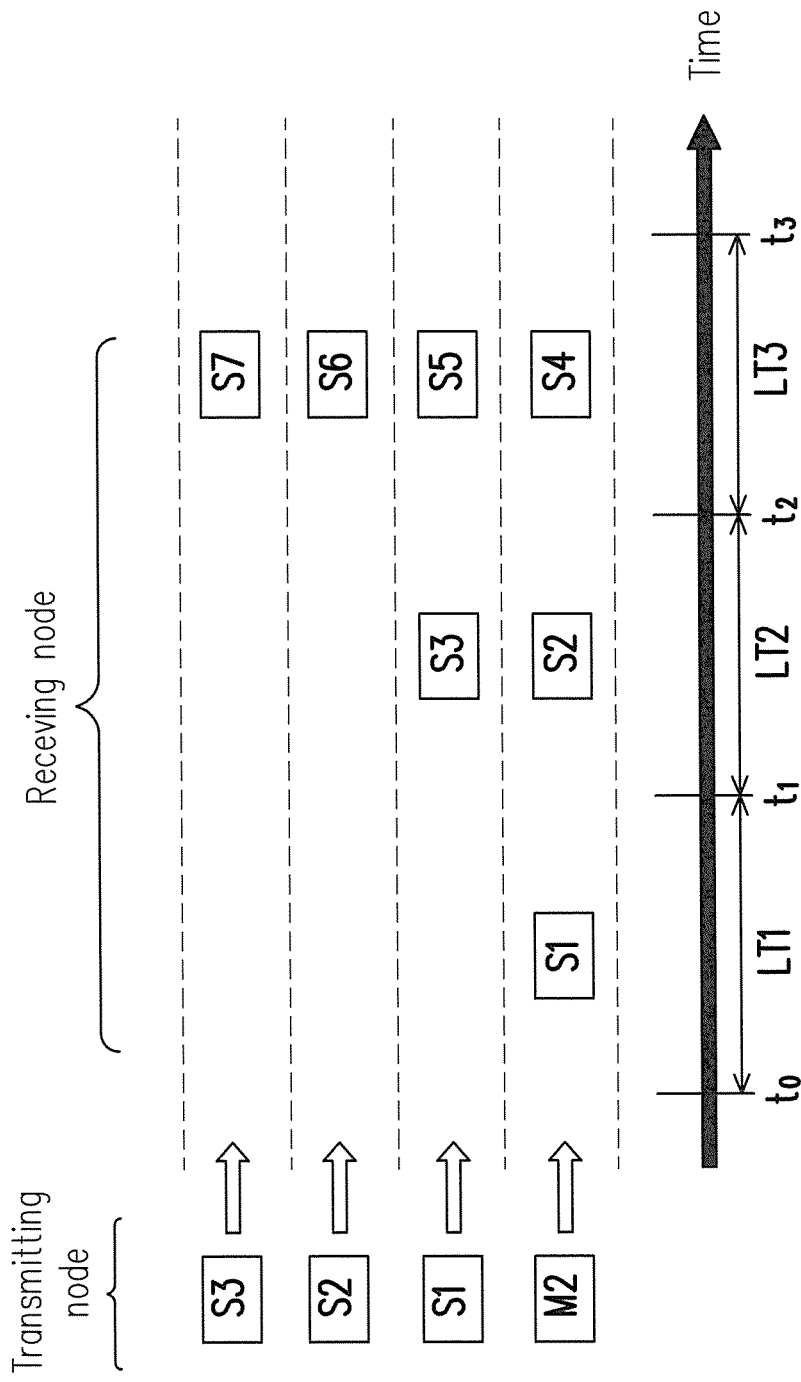
FIG. 12B is a schematic diagram illustrating a data transfer of a rebuilt topology architecture according to an embodiment of the invention.

FIG. 12B is a schematic diagram illustrating a data transfer of a rebuilt topology architecture according to an embodiment of the invention.

Referring to FIG. 12B, as compared with FIG. 6, it can be seen that the master device M2 replaces the original master device M1 for the corresponding layer transfer.

It is to be noted that, in an embodiment, the data transfer management device 100 may arrange the order of the slave devices in the receiving node queue according to the connection status of the slave devices. For example, the slave device having a higher connection speed with the master device M1 is arranged at more front position of the receiving node queue. In addition, the data transfer management device 100 may adjust the nodes according to the connection speed between two electronic devices after all the layer transfers are set. For example, if the data transfer management device 100 determines that the speed of the affected layer transfer would become faster if the fifth slave device S5 and the first slave device S1 are interchanged, the data transfer management device 100 may interchange the fifth slave device S5 with the first slave device S1, and set the affected layer transfer.

Furthermore, it should be noted that, when the data transfer management device 100 determines that the first specific event or the second specific event occurred, the data transfer management device 100 may first execute all the available layers transfer(s) for the data, and then perform the operation of repairing/rebuilding the topology architecture. Next, the data transfer management device 100 may perform synchronous data transfer for is used for the next data to be transferred by using the repaired/rebuilt topology architecture.

Based on the above, the data transfer system, and the topology architecture building method and the topology architecture repairing method thereof provided in the embodiments of the invention can distribute the transmission of the data by the manner of unicast and the using of the relay nodes, so as to ensure the correctness of the data, and reduce the time spent for overall synchronization of data transfer, such that the efficiency of data transfer would be increased. In another aspect, when some node of the built topology architecture is disconnected, the system and the methods can select proper other nodes to repair or rebuild the topology architecture, so as to maintain the stability of the overall topology architecture to ensure the data to keep being performed the synchronous transfer.

It will be apparent to those skilled in the art that various modifications and variations can be made to the architecture of the present invention without departing from the scope or spirit of the invention. In view of the foregoing, it is intended that the present invention cover modifications and variations of this invention provided they fall within the scope of the following claims and their equivalents.

What is claimed is:

1. A data transfer system for transferring a data, wherein the data transfer system comprises:
    a plurality of electronic devices; and
    a data transfer management device, coupled to the electronic devices, configured to build a topology architecture, wherein the topology architecture is configured to indicate a connection relationship and a transfer order between the electronic devices, wherein an operation of building the topology architecture comprises:
    the data transfer management device identifies a master device among the electronic devices, and the data transfer management device makes the master device as a root node of the topology architecture, wherein the master device is configured to provide the data;
    the data transfer management device calculates a maximum connection amount according to a first transfer time, wherein the first transfer time indicates an average time for transferring the data between two electronic devices;
    the data transfer management device selects a plurality of slave devices other than the master device among the electronic devices according to the maximum connection amount, wherein an amount of the slave devices is equal to the maximum connection amount;
    the data transfer management device divides the master device into a transmitting node queue, and arranges the slave devices into a receiving node queue in sequence; and
    the data transfer management device builds a plurality of layers of the topology architecture and sets a plurality of layer transfers corresponding to the layers according to the transmitting node queue and the receiving node queue,
wherein the data transfer management device indicates the master device and the slave devices to perform a transfer operation corresponding to the data according to the built topology architecture after the operation of building the topology architecture is completed,
wherein the data transfer management device selects, total seven slave devices, a first slave device, a second slave device, a third slave device, a fourth slave device, a fifth slave device, a sixth slave device and a seventh slave device other than the master device among the electronic devices if the maximum connection amount is seven, wherein the operation of the data transfer management device builds the layers of the topology architecture and sets the layer transfers corresponding to the layers according to the transmitting node queue and the receiving node queue comprises:
the data transfer management device sets a first layer of the topology and a first layer transfer corresponding to the first layer according to the transmitting node queue and the receiving node queue, wherein the data transfer management device selects the first slave device starting from a forefront of the receiving node queue according to the number of the devices in the receiving node queue, wherein the first slave device is arranged on the forefront of the receiving node queue, and the data transfer management device sets the master device among the transmitting node queue to connect to the selected first slave device among the receiving node queue during the first layer transfer, wherein the data transfer management device sets the first slave device as a first layer node of the first layer;
after setting the first slave device as the first layer node of the first layer, the data transfer management device moves the first slave device being the first layer node from the receiving node queue into the transmitting node queue and behind the master device, and the data transfer management device sets a second layer and a second layer transfer corresponding to the second layer according to the transmitting node queue and the receiving node queue, wherein the data transfer management device selects the second slave device and the third slave device sequentially starting from the forefront of the receiving node queue according to the number of the devices in the receiving node queue, wherein the second slave device is arranged on the forefront of the receiving node queue, and the data transfer management device sets the master device and the first slave device among the transmitting node queue to respectively connect to the selected second slave device and third slave device among the receiving node queue during the second layer transfer, wherein the data transfer management device sets the second slave device and the third slave device as second layer nodes of the second layer; and after setting the second slave device and the third slave device as the second layer nodes of the second layer, the data transfer management device moves the second slave device and the third slave device being the second layer nodes from the receiving node queue into the transmitting node queue and behind the first slave device, and the data transfer management device sets a third layer and a third layer transfer corresponding to the third layer according to the transmitting node queue and the receiving node queue, wherein the data transfer management device selects the fourth slave device, the fifth slave device, the sixth slave device and the seventh slave device sequentially starting from the forefront of the receiving node queue according to the number of the devices in the receiving node queue, wherein the fourth slave device is arranged on the forefront of the receiving node queue, and the data transfer management device sets the master device, the first slave device and the second slave device among the transmitting node queue to respectively connect to the selected fourth slave device, fifth slave device, sixth slave device and seventh slave device among the receiving node queue during the third layer transfer, wherein the data transfer management device sets the fourth slave device, the fifth slave device, the sixth slave device and the seventh slave device as third layer nodes of the third layer, wherein the data transfer management device determines the building of the topology architecture is completed after the fourth slave device, the fifth slave device, the sixth slave device and the seventh slave device are set as the third layer nodes of the third layer.

2. The data transfer system according to claim 1, wherein the operation of the data transfer management device indicates the master device and the slave device to perform a transfer operation corresponding to the data according to the built topology architecture comprises:

the data transfer management device indicates the master device and the slave device to perform the first layer transfer, the second layer transfer and the third layer transfer according to the topology architecture, wherein the second layer transfer is performed after the first layer transfer is completed, and the third layer transfer is performed after the second layer transfer is completed, wherein the first layer node receives the data during the first layer transfer, the second layer nodes receive the data during the second layer transfer, and the third layer nodes receive the data during the third layer transfer, wherein the master device transfers the data to the connected first slave device being the first layer node during the first layer transfer, wherein the master device and the first slave device respectively transfer the data to the second layer nodes, which are the connected second slave device and the connected third slave device, during the second layer transfer, wherein the master device, the first slave device, the second slave device and the third slave device respectively transfer the data to the third layer nodes, which are the connected fourth slave device, the connected fifth slave device, the connected sixth slave device and the connected seventh slave device, during the third layer transfer.

3. The data transfer system according to claim 1, wherein the data transfer management device repairs the topology architecture according to a first specific event and the topology architecture if the first specific event occurred, wherein the first specific event comprises one of the plurality of slave devices is removed from the topology architecture, wherein the one slave device removed from the topology architecture is a removed slave device, wherein the data transfer management device indicates the master device and the plurality of slave devices to perform a transfer operation corresponding to the data according to the repaired topology architecture after repairing of the topology architecture is completed.

4. The data transfer system according to claim 3, wherein the operation of the data transfer management device repairs the topology architecture according to the first specific event and the topology architecture comprises:

the data transfer management device identifies the removed slave device as a vacant node of the topology architecture according to the first specific event;

if the vacant node is not in a lowest layer of the topology architecture, the data transfer management device selects a child node among a plurality of child nodes connecting to the vacant node as a substituting node according to the vacant node, or selects a node not connecting to the root node from a plurality of nodes in the lowest layer as the substituting node, wherein a plurality of nodes at ends of the topology architecture constitute the lowest layer of the topology architecture; and the data transfer management device substitutes to the removed slave device by a substituting device of the substituting node as the vacant node of the topology architecture, and resets layer transfers related to the vacant node and the substituting node.

5. The data transfer system according to claim 4, wherein the operation of the data transfer management device repairs the topology architecture according to the first specific event and the topology architecture further comprises:

if the vacant node is in the lowest layer of the topology architecture, the data transfer management device selects a node not connecting to the root node from a plurality of other nodes in the lowest layer as the substituting node.

6. The data transfer system according to claim 1, wherein the operation of the data transfer management device calculates the maximum connection amount according to the first transfer time comprises:

the data transfer management device divides a tolerance time by the first transfer time to obtain a first quotient value, wherein the first transfer time is a second quotient value obtained by dividing the size of the data by an average connection speed, wherein the time spent for transferring the data from the master device to all the slave devices through the layer transfers is needed to be less than the tolerance time;

the data transfer management device unconditionally rounds the first quotient value to an integer to obtain a value as a maximum layer transfer amount, wherein the total amount of the layers of the topology architecture is equal to the maximum layer transfer amount; and the data transfer management device calculates a result of $2^K$ and subtracts the result by one to obtain a difference value as the maximum connection amount, wherein K is the maximum layer transfer amount.

7. The data transfer system according to claim 1, wherein the data transfer management device rebuilds the topology architecture according to another master device and the plurality of slave devices in the topology architecture if a second specific event occurred, wherein the second specific event comprises the another master device replaces the master device to provide the data; and the data transfer management device indicates the another master device and the slave devices to perform a transfer operation corresponding to the data according to the rebuilt topology architecture after the rebuilding of the topology architecture is completed.

8. A topology architecture building method, for a plurality of electronic devices, comprising:

identifying a master device among the electronic devices, and making the master device as a root node of a topology architecture, wherein the master device is configured to provide a data;

calculating a maximum connection amount according to a first transfer time, wherein the first transfer time indicates an average time for transferring the data between two electronic devices;

selecting a plurality of slave devices other than the master device among the electronic devices according to the maximum connection amount, wherein an amount of the slave devices is equal to the maximum connection amount;

dividing the master device into a transmitting node queue, and arranges the slave devices into a receiving node queue in sequence; and building a plurality of layers of the topology architecture and setting a plurality of layer transfers corresponding to the layers according to the transmitting node queue and the receiving node queue, wherein if the maximum connection amount is seven, selecting, total seven slave devices, a first slave device, a second slave device, a third slave device, a fourth slave device, a fifth slave device, a sixth slave device and a seventh slave device other than the master device among the electronic devices, wherein the step of building the layers of the topology architecture and setting the layer transfers corresponding to the layers according to the transmitting node queue and the receiving node queue comprises:

(1-1) selecting the first slave device starting from a forefront of the receiving node queue according to the number of the devices in the receiving node queue, wherein the first slave device is arranged on the forefront of the receiving node queue;

(1-2) setting the first slave device as a first layer node of a first layer, and setting the master device among the transmitting node queue to connect to the selected first slave device among the receiving node queue during the first layer transfer;

(1-3) after setting the first slave device as the first layer node of the first layer, moving the first slave device being the first layer node from the receiving node queue into the transmitting node queue and behind the master device;

(2-1) selecting the second slave device and the third slave device sequentially starting from the forefront of the receiving node queue according to the number of the devices in the receiving node queue, wherein the second slave device is arranged on the forefront of the receiving node queue;

(2-2) setting the second slave device and the third slave device as second layer nodes of a second layer, and setting the master device and the first slave device among the transmitting node queue to respectively connect to the selected second slave device and third slave device among the receiving node queue during the second layer transfer;

(2-3) after setting the second slave device and the third slave device as the second layer nodes of the second layer, moving the second slave device and the third slave device being the second layer nodes from the receiving node queue into the transmitting node queue and behind the first slave device;

(3-1) selecting the fourth slave device, the fifth slave device, the sixth slave device and the seventh slave device sequentially starting from the forefront of the receiving node queue according to the number of the devices in the receiving node queue, wherein the fourth slave device is arranged on the forefront of the receiving node queue;

(3-2) setting the fourth slave device, the fifth slave device, the sixth slave device and the seventh slave device as third layer nodes of a third layer, and setting the master device, the first slave device and the second slave device among the transmitting node queue to respectively connect to the selected fourth slave device, fifth slave device, sixth slave device and seventh slave device among the receiving node queue during the third layer transfer;

(3-3) after setting the fourth slave device, the fifth slave device, the sixth slave device and the seventh slave device as the third layer nodes of the third layer, moving the fourth slave device, the fifth slave device, the sixth slave device and the seventh slave device being the third layer nodes from the receiving node queue into the transmitting node queue and behind the third slave device; and (4-1) determining that the building of the topology architecture is completed if the receiving node queue does not have any electronic device.

9. The topology architecture building method according to claim 8, wherein the step of indicating the master device and the slave device to perform a transfer operation corresponding to the data according to the built topology architecture comprises:

indicating the master device and the slave device to perform the first layer transfer, the second layer transfer and the third layer transfer according to the topology architecture, wherein the second layer transfer is performed after the first layer transfer is completed, and the third layer transfer is performed after the second layer transfer is completed, wherein the first layer node receives the data during the first layer transfer, the second layer nodes receive the data during the second layer transfer, and the third layer nodes receive the data during the third layer transfer, wherein the master device transfers the data to the connected first slave device being the first layer node during the first layer transfer, wherein the master device and the first slave device respectively transfer the data to the second layer nodes, which are the connected second slave device and the connected third slave device, during the second layer transfer, wherein the master device, the first slave device, the second slave device and the third slave device respectively transfer the data to the third layer nodes, which are the connected fourth slave device, the connected fifth slave device, the connected sixth slave device and the connected seventh slave device, during the third layer transfer.

10. The topology architecture building method according to claim 8, wherein the step of calculating the maximum connection amount according to the first transfer time comprises:

dividing a tolerance time by the first transfer time to obtain a first quotient value, wherein the first transfer time is a second quotient value obtained by dividing the size of the data by an average connection speed, wherein the time spent for transferring the data from the master device to all the slave devices through the layer transfers is needed to be less than the tolerance time;

unconditionally rounding the first quotient value to an integer to obtain a value as a maximum layer transfer amount, wherein the total amount of the layers of the topology architecture is equal to the maximum layer transfer amount; and calculating a result of $2^K$ and subtracts the result by one to obtain a difference value as the maximum connection amount, wherein K is the maximum layer transfer amount.

* * * * *